(12) United States Patent
Nakayama

(10) Patent No.: US 12,125,167 B2
(45) Date of Patent: Oct. 22, 2024

(54) IMAGE PROCESSING DEVICE, IMAGE PROCESSING METHOD, AND IMAGE PROCESSING SYSTEM

(71) Applicant: Sony Semiconductor Solutions Corporation, Kanagawa (JP)

(72) Inventor: Satoshi Nakayama, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 563 days.

(21) Appl. No.: 17/299,245

(22) PCT Filed: Dec. 10, 2019

(86) PCT No.: PCT/JP2019/048245
§ 371 (c)(1),
(2) Date: Jun. 2, 2021

(87) PCT Pub. No.: WO2020/122057
PCT Pub. Date: Jun. 18, 2020

(65) Prior Publication Data
US 2022/0130024 A1    Apr. 28, 2022

(30) Foreign Application Priority Data
Dec. 10, 2018    (JP) ................. 2018-231204

(51) Int. Cl.
*G06T 5/50*    (2006.01)
*G06T 7/269*    (2017.01)

(52) U.S. Cl.
CPC ............... *G06T 5/50* (2013.01); *G06T 7/269* (2017.01); *G06T 2207/30252* (2013.01)

(58) Field of Classification Search
CPC ....................................................... G06T 5/50
See application file for complete search history.

(56) References Cited

U.S. PATENT DOCUMENTS

| 2003/0122951 A1 | 7/2003 | Hara |
| 2010/0182450 A1 | 7/2010 | Kumar |
| 2013/0077060 A1 | 3/2013 | Sakai |

(Continued)

FOREIGN PATENT DOCUMENTS

| CN | 1429013 A | 7/2003 |
| CN | 104396235 A | 3/2015 |

(Continued)

OTHER PUBLICATIONS

International Written Opinion and English translation thereof mailed Mar. 3, 2020 in connection with International Application No. PCT/JP2019/048245.

(Continued)

*Primary Examiner* — Edward Park
(74) *Attorney, Agent, or Firm* — Wolf, Greenfield & Sacks, P.C.

(57) ABSTRACT

An information processing device includes: an acquisition unit that acquires a captured image; a superimposition unit that generates a superimposition image in which images are superimposed on unused areas of the captured image; and a determination unit that determines a state of the captured image on the basis of characteristics of areas on which the images are superimposed in the superimposition image transmitted from the superimposition unit.

18 Claims, 22 Drawing Sheets

(56) References Cited

U.S. PATENT DOCUMENTS

| | | | | |
|---|---|---|---|---|
| 2013/0241896 A1* | 9/2013 | Ishitsuka | ................ | G06F 9/451 345/178 |
| 2013/0265608 A1* | 10/2013 | Yoshida | ............. | G06K 15/1878 358/2.1 |
| 2014/0064554 A1* | 3/2014 | Coulter | ................... | G06T 7/254 382/294 |
| 2015/0165974 A1* | 6/2015 | Yokota | ...................... | B60R 1/00 348/148 |
| 2016/0301923 A1 | 10/2016 | Ichige | | |
| 2016/0344935 A1* | 11/2016 | Ardö | ....................... | H04N 25/61 |
| 2016/0375360 A1* | 12/2016 | Poisner | ................... | A63F 13/25 345/158 |
| 2022/0130024 A1* | 4/2022 | Nakayama | ............. | H04N 5/262 |

FOREIGN PATENT DOCUMENTS

| | | |
|---|---|---|
| CN | 105245869 A | 1/2016 |
| CN | 108028883 A | 5/2018 |
| EP | 2 879 381 A1 | 6/2015 |
| EP | 3 094 075 A1 | 11/2016 |
| JP | S56-54179 A | 5/1981 |
| JP | 2007283604 A | 11/2007 |
| JP | 2009-135684 A | 6/2009 |
| JP | 2015-171106 A | 9/2015 |
| JP | 2016-171457 A | 9/2016 |
| JP | 2017212638 A | 11/2017 |
| WO | WO 2014/017105 A1 | 1/2014 |
| WO | WO 2015/104915 A1 | 7/2015 |

OTHER PUBLICATIONS

International Search Report and English translation thereof mailed Mar. 3, 2020 in connection with International Application No. PCT/JP2019/048245.

\* cited by examiner

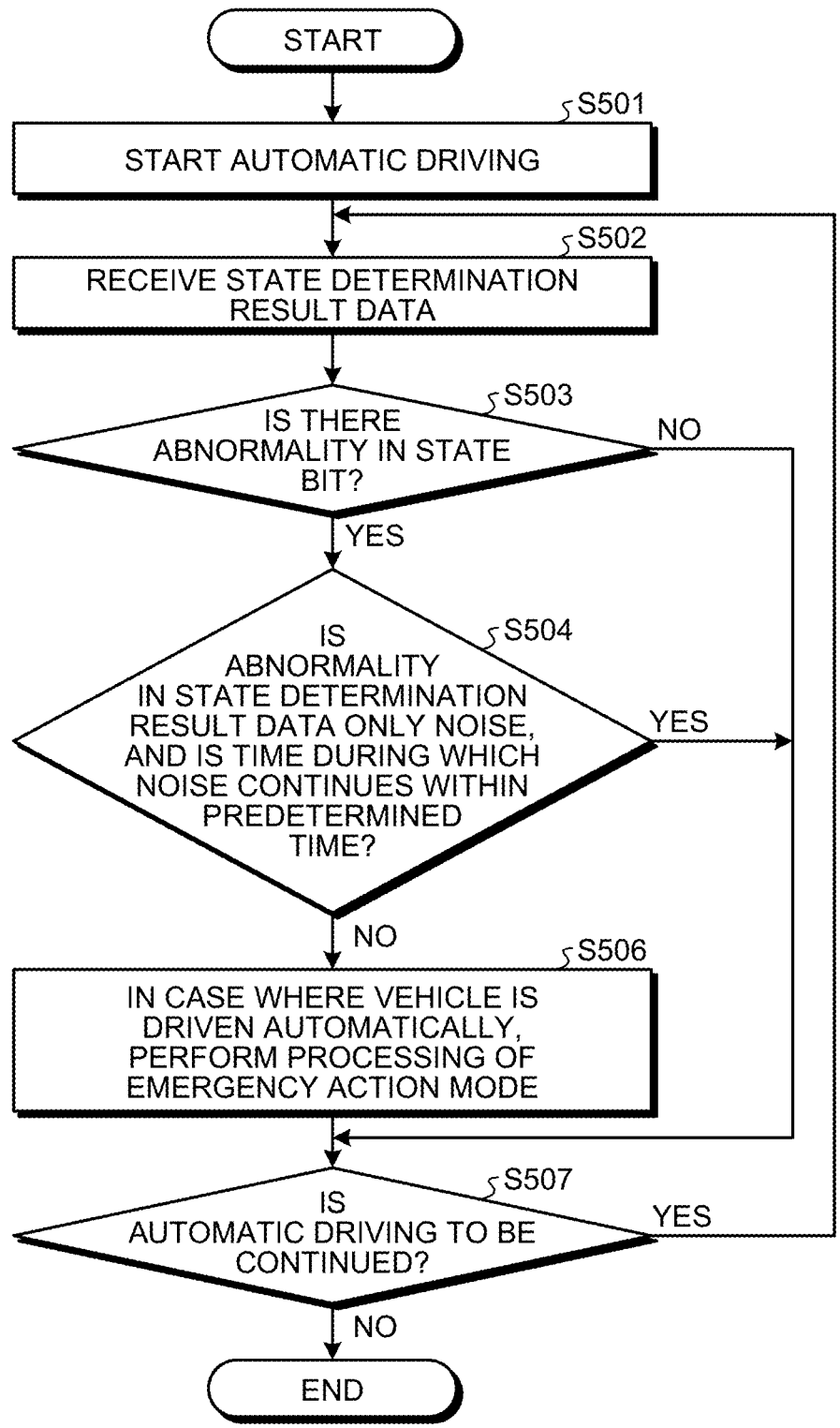

IMAGE PROCESSING DEVICE, IMAGE PROCESSING METHOD, AND IMAGE PROCESSING SYSTEM

CROSS-REFERENCE TO RELATED APPLICATIONS

This application claims the benefit under 35 U.S.C. § 371 as a U.S. National Stage Entry of International Application No. PCT/JP2019/048245, filed in the Japanese Patent Office as a Receiving Office on Dec. 10, 2019, which claims priority to Japanese Patent Application Number JP 2018-231204, filed in the Japanese Patent Office on Dec. 10, 2018, each of which is hereby incorporated by reference in its entirety.

FIELD

The present disclosure relates to an image processing device, an image processing method, and an image processing system.

BACKGROUND

An in-vehicle camera system includes an initial-stage image processing integrated circuit (IC) including an imaging element and a subsequent-stage image processing IC having a recognition function and the like. Further, another image processing IC, a memory, a buffer, a signal transmission circuit, and the like are included between the initial-stage image processing IC and the subsequent-stage image processing IC.

CITATION LIST

Patent Literature

Patent Literature 1: JP 2015-171106 A

SUMMARY

Technical Problem

However, in the above-described related art, image information transmitted from the initial-stage image processing IC may be changed before reaching the subsequent-stage image processing IC.

In a case where the subsequent-stage image processing IC performs recognition processing on the changed image information, erroneous recognition may be performed, and thus, it is necessary to determine a state of the image information transmitted from the initial-stage image processing IC.

Therefore, the present disclosure proposes an image processing device, an image processing method, and an image processing system capable of determining a state of image information.

Solution to Problem

According to the present disclosure, an image processing device includes an acquisition unit that acquires a captured image; a superimposition unit that generates a superimposition image in which images are superimposed on unused areas of the captured image; and a determination unit that determines a state of the captured image on a basis of characteristics of areas on which the images are superimposed in the superimposition image transmitted from the superimposition unit.

BRIEF DESCRIPTION OF DRAWINGS

FIG. 22 is a flowchart illustrating a processing procedure of an automatic driving emergency action mode.

DESCRIPTION OF EMBODIMENTS

Hereinafter, embodiments of the present disclosure will be described in detail with reference to the drawings. Note

1. First Embodiment

Figure 1:
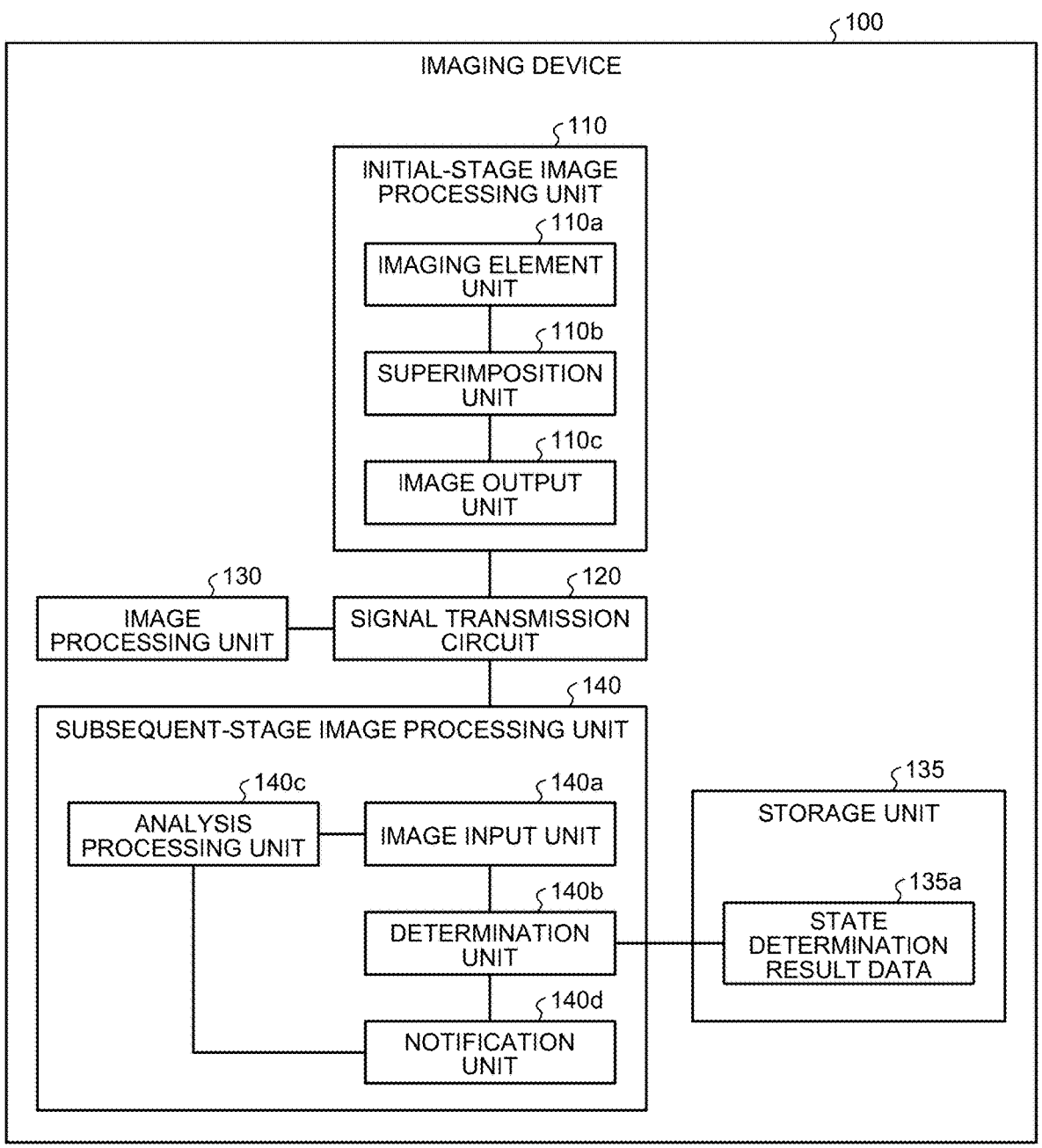
FIG. 1 is a diagram illustrating an example of a functional configuration of an imaging device according to a first embodiment.

1-1. Functional Configuration of Imaging Device According to First Embodiment FIG. 1 is a diagram illustrating an example of a functional configuration of an imaging device according to a first embodiment. As illustrated in FIG. 1, an imaging device 100 includes an initial-stage image processing unit 110, a signal transmission circuit 120, an image processing unit 130, a storage unit 135, and a subsequent-stage image processing unit 140. For example, the imaging device 100 is a device included in an in-vehicle system mounted on a vehicle. The imaging device 100 is an example of an image processing device.

The initial-stage image processing unit 110, the image processing unit 130, and the subsequent-stage image processing unit 140 are each implemented by, for example, an integrated circuit (IC).

The initial-stage image processing unit 110 is connected to the signal transmission circuit 120. The image processing unit 130 is connected to the signal transmission circuit 120. The subsequent-stage image processing unit 140 is connected to the signal transmission circuit 120.

The initial-stage image processing unit 110 is a device corresponding to an image sensor such as a complementary metal oxide semiconductor (CMOS) or charge coupled device (CCD), or the like. For example, the initial-stage image processing unit 110 includes an imaging element unit 110a, a superimposition unit 110b, and an image output unit 110c. Note that the initial-stage image processing unit 110 restarts in a case where a reset command is received from the subsequent-stage image processing unit 140 or the like.

The imaging element unit 110a is a processing unit that generates (acquires) a video signal by converting light incident through a camera lens (not illustrated) into an electric signal. The imaging element unit 110a is an example of an acquisition unit. In the following description, the video signal generated by the imaging element unit 110a is referred to as a "captured image". The imaging element unit 110a outputs the captured image to the superimposition unit 110b. The imaging element unit 110a repeatedly performs the above-described process at a predetermined frame rate (frames per second (FPS)).

The superimposition unit 110b is a processing unit that generates a superimposition image in which images are superimposed on unused areas of the captured image. For example, the unused area corresponds to an unexposed area outside an image circle in the captured image. Note that, even in a case of an exposed area in the image circle, an area that is not used by the image processing unit 130, the subsequent-stage image processing unit 140, or the like may correspond to the unused area.

A check image superimposed by the superimposition unit 110b on the unused area of the captured image is a pattern image having a plurality of luminances. For example, the superimposition unit 110b superimposes a plurality of types of images having a single luminance, or an image with gradation, whose luminance is gradually changed, as the pattern image on the unused area of the captured image. In the following description, the image having a single luminance is referred to as a "single-luminance image". The image with gradation is referred to as a "gradation image".

Further, in a case where the single-luminance image and the gradation image are not particularly distinguished, they are referred to as the "pattern images". The superimposition unit 110b may superimpose an image by using a bitmap stored in a memory (not illustrated), or a CPU/GPU of the IC may draw an image.

Figure 2:
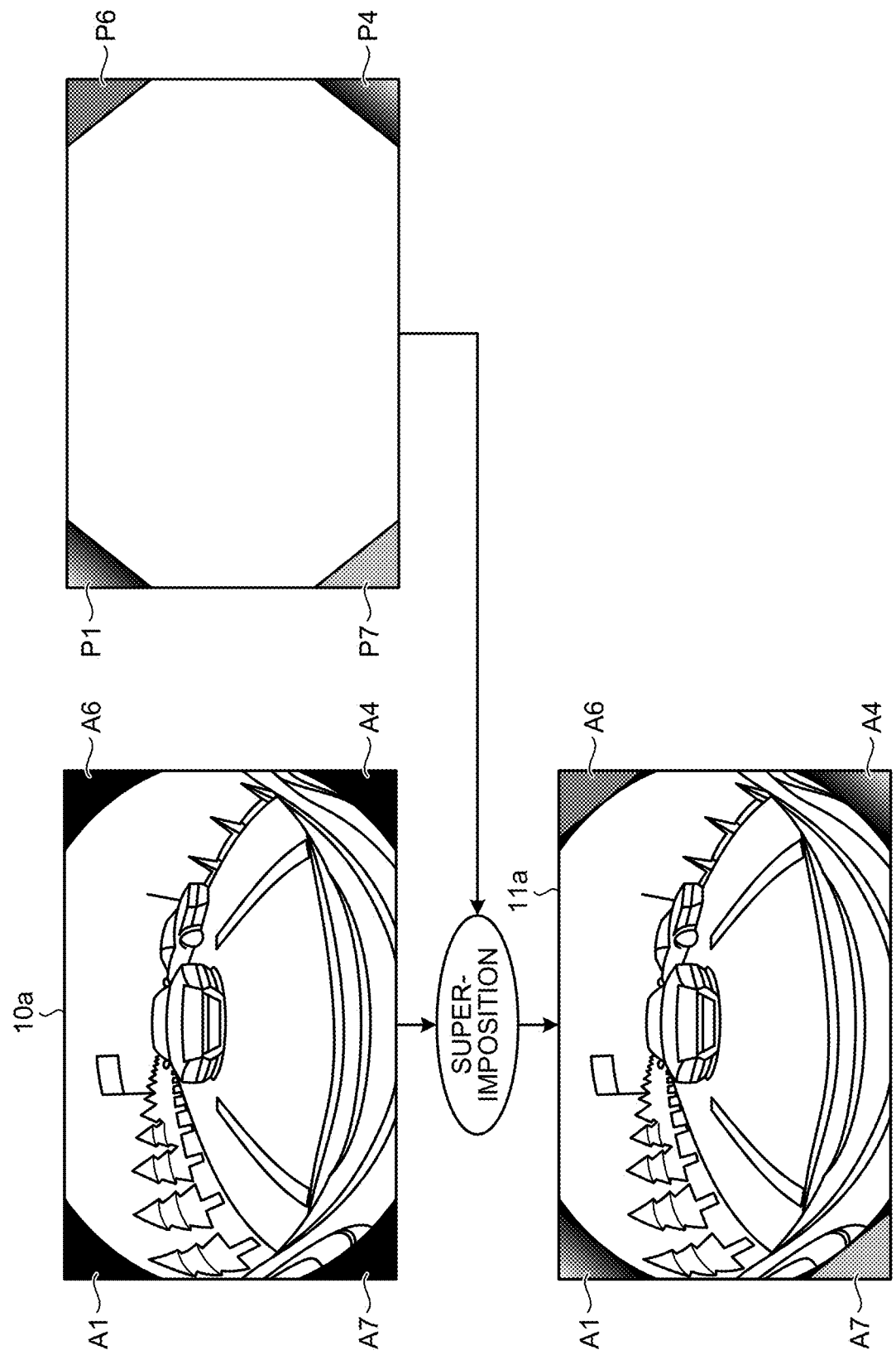
FIG. 2 is a diagram (1) for describing processing performed by a superimposition unit according to the first embodiment.
Figure 3:
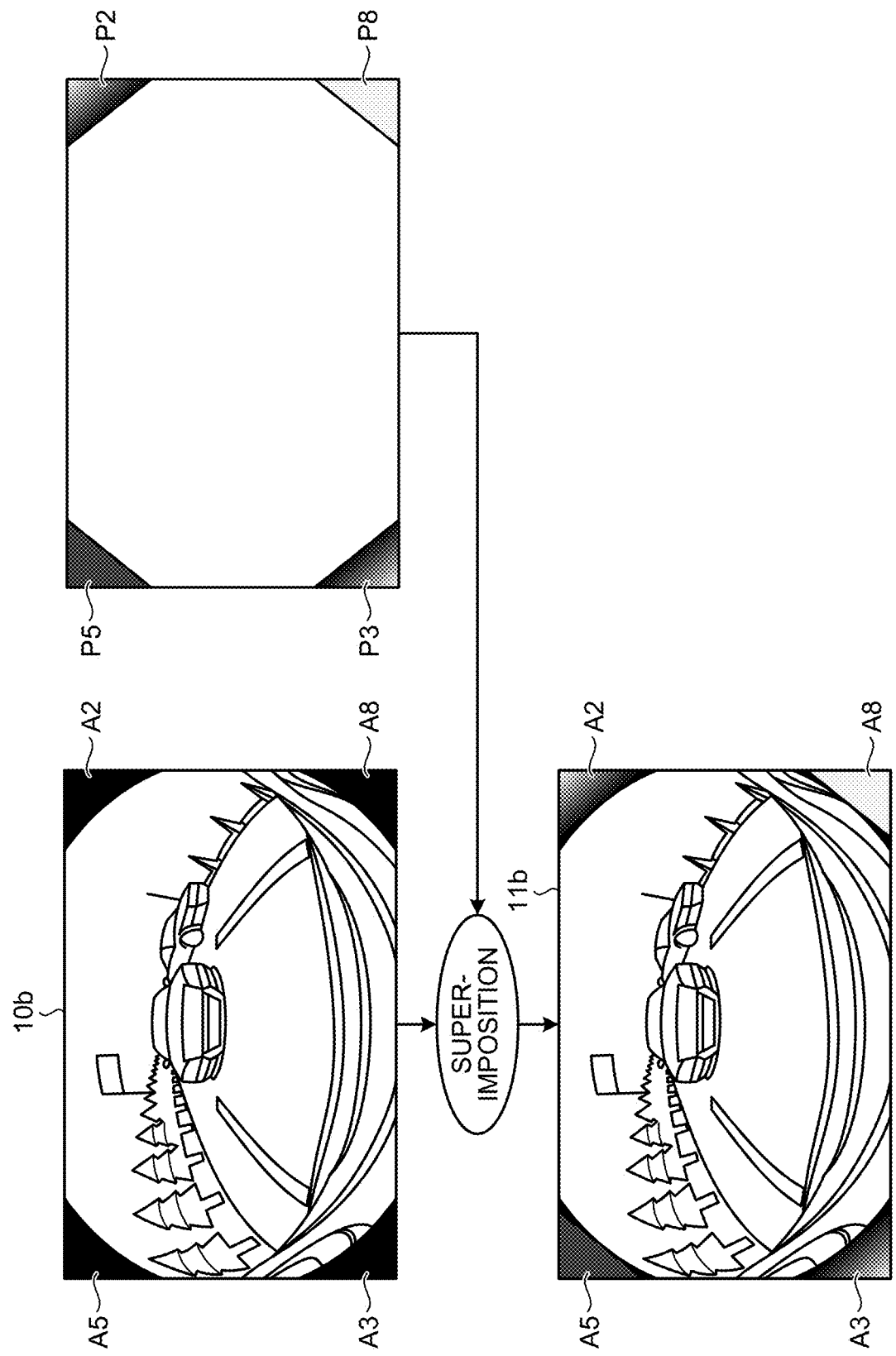
FIG. 3 is a diagram (2) for describing the processing performed by the superimposition unit according to the first embodiment.

FIGS. 2 and 3 are diagrams for describing processing performed by the superimposition unit according to the first embodiment. FIG. 2 will be described. In the example illustrated in FIG. 2, the 2n−1-th (n is a natural number) captured image 10a includes areas A1, A4, A6, and A7 corresponding to the unused areas. The superimposition unit 110b superimposes a gradation image P1 on the area A1. The superimposition unit 110b superimposes a gradation image P4 on the area A4. The superimposition unit 110b superimposes a single-luminance image P6 on the area A6. The superimposition unit 110b superimposes a single-luminance image P7 on the area A7. Here, a luminance value of the single-luminance image P6 and a luminance value of the single-luminance image P7 are different from each other. In this way, the superimposition unit 110b generates a superimposition image 11a.

FIG. 3 will be described. In the example illustrated in FIG. 3, the 2n-th captured image 10b includes areas A2, A3, A5, and A8 that are the unused areas. The superimposition unit 110b superimposes a gradation image P2 on the area A2. The superimposition unit 110b superimposes a gradation image P3 on the area A3. The superimposition unit 110b superimposes a single-luminance image P5 on the area A5. The superimposition unit 110b superimposes a single-luminance image P8 on the area A8. Here, a luminance value of the single-luminance image P5 and a luminance value of the single-luminance image P8 are different from each other. In this way, the superimposition unit 110b generates a superimposition image 11b.

As described above, the superimposition unit 110b acquires a plurality of captured images from the imaging element unit 110a, and superimposes each of the pattern images P1, P4, P6, and P7 on the 2n−1-th captured image 10a to generate the superimposition image 11a. The superimposition unit 110b superimposes each of the pattern images P2, P3, P5, and P8 on the 2n-th captured image 10b to generate the superimposition image 11b. The superimposition unit 110b outputs the superimposition images 11a and 11b to the image output unit 110c in order.

The image output unit 110c is a processing unit that acquires the superimposition images 11a and 11b from the superimposition unit 110b and outputs the acquired superimposition images 11a and 11b to the signal transmission circuit 120. The superimposition images 11a and 11b are transmitted through the signal transmission circuit 120 and reach the image processing unit 130 and the subsequent-stage image processing unit 140.

The signal transmission circuit 120 is a circuit that transmits signals such as the superimposition images 11a and 11b received from the initial-stage image processing unit 110. For example, the signal transmission circuit 120 includes a buffer, a memory, and various signal processing ICs, and the superimposition images 11a and 11b, and the like are transmitted to the image processing unit 130 and the subsequent-stage image processing unit 140 via the buffer, the memory, and various signal processing ICs.

The image processing unit 130 is a processing unit that performs various image processing on the basis of an area other than the unused areas included in the superimposition images 11a and 11b.

The storage unit 135 is a storage device that holds state determination result data 135a. The storage unit 135 corresponds to a semiconductor memory element such as a random access memory (RAM), a read only memory (ROM), or a flash memory, or a storage device such as a hard disk drive (HDD). The storage unit 135 may be any one of a volatile memory or a non-volatile memory, or both of the volatile memory and the non-volatile memory may be used.

Figure 4:
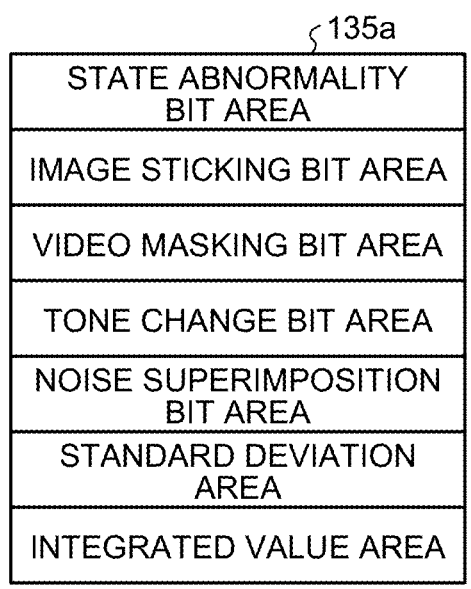
FIG. 4 is a diagram illustrating an example of a data structure of state determination result data according to the first embodiment.

The state determination result data 135a is information on a result of determining a state of the captured image. FIG. 4 is a diagram illustrating an example of a data structure of the state determination result data according to the first embodiment. As illustrated in FIG. 4, the state determination result data 135a has a state abnormality bit area, an image sticking bit area, a video masking bit area, a tone change bit area, and a noise superimposition bit area. In each bit area, "1" or "0" is set by the subsequent-stage image processing unit 140.

In a case where there is an abnormality in the captured image, "1" is set in the state abnormality bit area, and in a case where there is no abnormality in the captured image, "0" is set in the state abnormality bit area. In a case where there is an abnormality of image sticking in the captured image, "1" is set in the image sticking bit area, and in a case where there is no abnormality of image sticking, "0" is set in the image sticking bit area.

Further, the state determination result data 135a has a standard deviation area and an integrated value area. The standard deviation area is an area that holds standard deviations calculated from the areas A1 to A8. The integrated value area is an area that holds integrated values calculated from the areas A1 to A8.

In a case where there is an abnormality of video masking in the captured image, "1" is set in the video masking bit area, and in a case where there is no abnormality of video masking, "0" is set in the video masking bit area. In a case where there is an abnormality of a tone change in the captured image, "1" is set in the tone change bit area, and in a case where there is no abnormality of a tone change, "0" is set in the tone change bit area. In a case where there is an abnormality of noise superimposition in the captured image, "1" is set in the noise superimposition bit area, and in a case where there is no abnormality of noise superimposition, "0" is set in the noise superimposition bit area.

The subsequent-stage image processing unit 140 is a processing unit that determines a state of the captured image on the basis of the superimposition images 11a and 11b and stores the state determination result data 135a in the storage unit 135. The subsequent-stage image processing unit 140 notifies another circuit of an external device (not illustrated) or the imaging device 100 of the state determination result data 135a. Further, the subsequent-stage image processing unit 140 performs sensing processing and the like on the superimposition images 11a and 11b.

For example, the subsequent-stage image processing unit 140 includes an image input unit 140a, a determination unit 140b, an analysis processing unit 140c, and a notification unit 140d. The analysis processing unit 140c is an example of a sensing processing unit.

The image input unit 140a is a processing unit that acquires the superimposition images 11a and 11b transmitted from the initial-stage image processing unit 110. The image input unit 140a outputs the superimposition images 11a and 11b to the determination unit 140b. Further, the image input unit 140a outputs the superimposition images 11a and 11b to the analysis processing unit 140c.

The determination unit 140b is a processing unit that determines a state of the captured image on the basis of the superimposition images 11a and 11b. The determination unit 140b sets "1" in each bit area of the state determination result data 135a according to a determination result. Note that an initial value of each bit area of the state determination result data 135a is set to "0". The determination unit 140b generates the state determination result data 135a by performing such processing, and stores the state determination result data 135a in the storage unit 150. Further, the determination unit 140b outputs the state determination result data 135a to the notification unit 140d.

As described below, the determination unit 140b performs processing of calculating a standard deviation of luminance values and an integrated value of the luminance values, and processing of determining the state.

Figure 5:
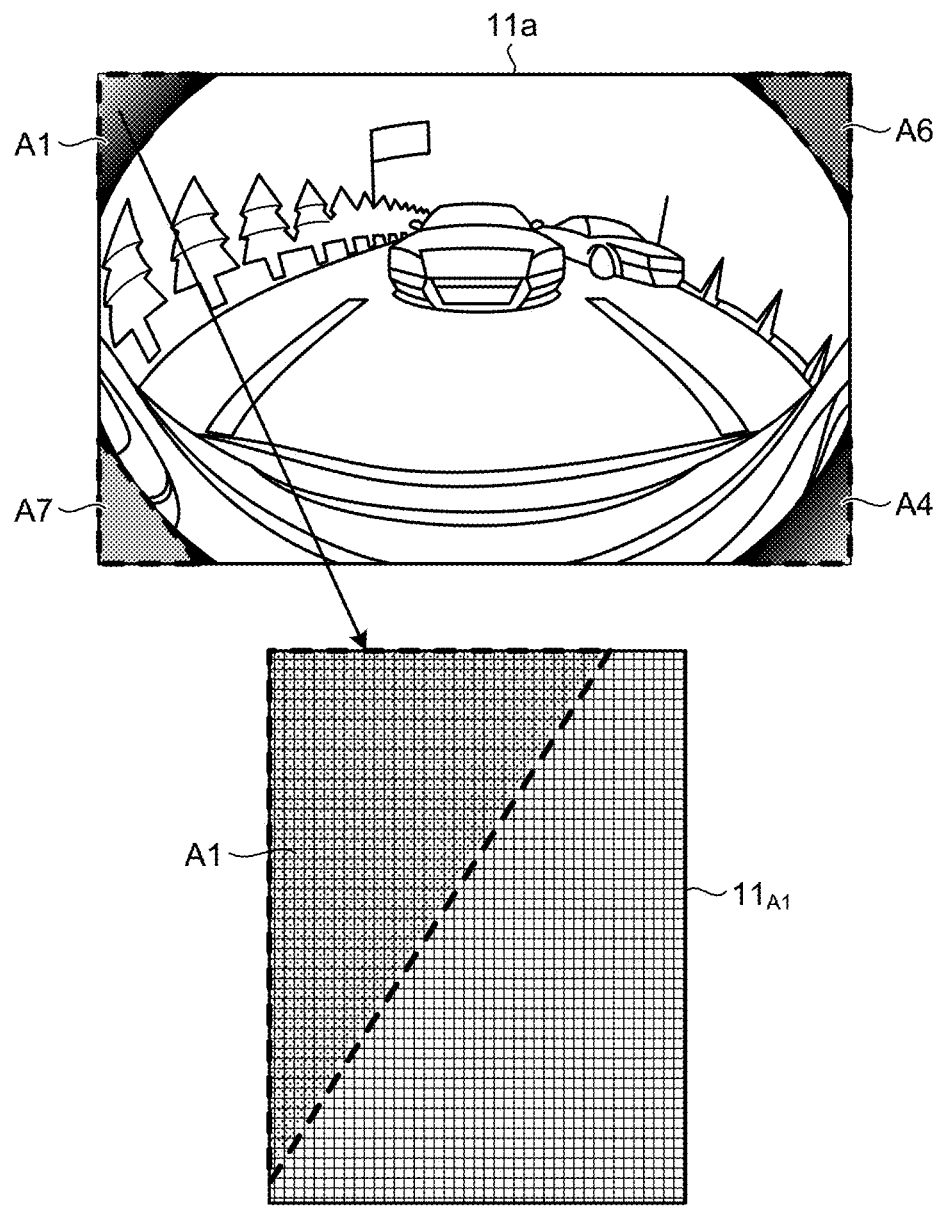
FIG. 5 is a diagram for describing processing performed by a determination unit.

The processing in which the determination unit 140b calculates a standard deviation of luminance values and an integrated value of the luminance values will be described. FIG. 5 is a diagram for describing processing performed by the determination unit. For example, the determination unit 140b calculates a standard deviation of luminance values and an integrated value of the luminance values from each of the areas A1 to A8 of the superimposition images 11a and 11b, and determines a state of the captured image. As an example, a case of calculating a standard deviation of the area A1 of the superimposition image 11a will be described with reference to FIG. 5. A partial area $11_{A1}$ is an enlarged area around the area A1. The area A1 is composed of a plurality of pixels. The determination unit 140b calculates a standard deviation of the area A1 on the basis of Equation (1).

$$\sigma = \frac{1}{n} \sum_{i=1}^{n} (Y_i - Y_{Ave})^2 \qquad (1)$$

In Equation (1), "n" indicates the number of pixels in an area whose standard deviation is to be calculated. "$Y_i$" indicates a luminance value of each pixel in the area whose standard deviation is to be calculated. "$Y_{AVE}$" indicates an average value of luminance values of all the pixels in the area whose standard deviation is to be calculated.

The determination unit 140b calculates an integrated value by summing luminance values of respective images in an area whose integrated value is to be calculated. The area whose integrated value is to be calculated is the same as the area whose standard deviation is to be calculated. The determination unit 140b calculates an integrated value of luminance values of the area A1 by summing luminance values of respective pixels of the area A1.

The determination unit 140b also calculates the standard deviation and the integrated value of each of the areas A2 to A8 in the same manner as that for the area A1.

Subsequently, the processing of determining the state performed by the determination unit 140b will be described. Note that the determination unit 140b holds in advance expected values of the standard deviations and expected values of the integrated values of the areas A1 to A8 of the superimposition images 11a and 11b.

For example, the determination unit 140b determines whether or not difference values D1a to D1h calculated by Equations (2a) to (2h) are equal to or more than a threshold value Th1-1. In Equations (2a) to (2h), $\sigma_{A1}$ to $\sigma_{A8}$ are standard deviations of the luminance values of the areas A1 to A8. $e1_{A1}$ to $e1_{A8}$ are expected values of the standard deviations of the areas A1 to A8.

$$D1a = |\sigma_{A1} - e1_{A1}| \quad (2a)$$

$$D1b = |\sigma_{A2} - e1_{A2}| \quad (2b)$$

$$D1c = |\sigma_{A3} - e1_{A3}| \quad (2c)$$

$$D1d = |\sigma_{A4} - e1_{A4}| \quad (2d)$$

$$D1e = |\sigma_{A5} - e1_{A5}| \quad (2e)$$

$$D1f = |\sigma_{A6} - e1_{A6}| \quad (2f)$$

$$D1g = |\sigma_{A7} - e1_{A7}| \quad (2g)$$

$$D1h = |\sigma_{A8} - e1_{A8}| \quad (2h)$$

Further, the determination unit 140b determines whether or not difference values D2a to D2h calculated by Equations (3a) to (3h) are equal to or more than a threshold value Th1-2. In Equations (3a) to (3h), $I_{A1}$ to $I_{A8}$ are integrated values of the luminance values of the areas A1 to A8. $e2_{A1}$ to $e2_{A1}$ are expected values of the integrated values of the areas A1 to A8.

$$D2a = |I_{A1} - e2_{A1}| \quad (3a)$$

$$D2b = |I_{A2} - e2_{A2}| \quad (3b)$$

$$D2c = |I_{A3} - e2_{A3}| \quad (3c)$$

$$D2d = |I_{A4} - e2_{A4}| \quad (3d)$$

$$D2e = |I_{A5} - e2_{A5}| \quad (3e)$$

$$D2f = |I_{A6} - e2_{A6}| \quad (3f)$$

$$D2g = |I_{A7} - e2_{A7}| \quad (3g)$$

$$D2h = |I_{A8} - e2_{A8}| \quad (3h)$$

In a case where any one of the difference values D1a to D1h is equal to or more than the threshold value Th1-1, or any one of the difference values D2a to D2h is equal to or more than the threshold value Th1-2, the determination unit 140b determines that there is an abnormality in the captured image, and sets 1 in the state abnormality bit area of the state determination result data 135a.

In a case where it is determined that there is an abnormality in the captured image, the determination unit 140b stores the standard deviations of the areas A1 to A8 in the standard deviation area of the state determination result data 135a. Further, the integrated values of the areas A1 to A8 are stored in the integrated value area of the state determination result data 135a.

Further, in a case where it is determined that there is an abnormality in the captured image, the determination unit 140b performs processing of determining whether or not image sticking, video masking, a tone change, and noise superimposition have occurred. On the other hand, in a case where it is determined that there is no abnormality in the captured image, the determination unit 140b ends the processing.

Figure 6:
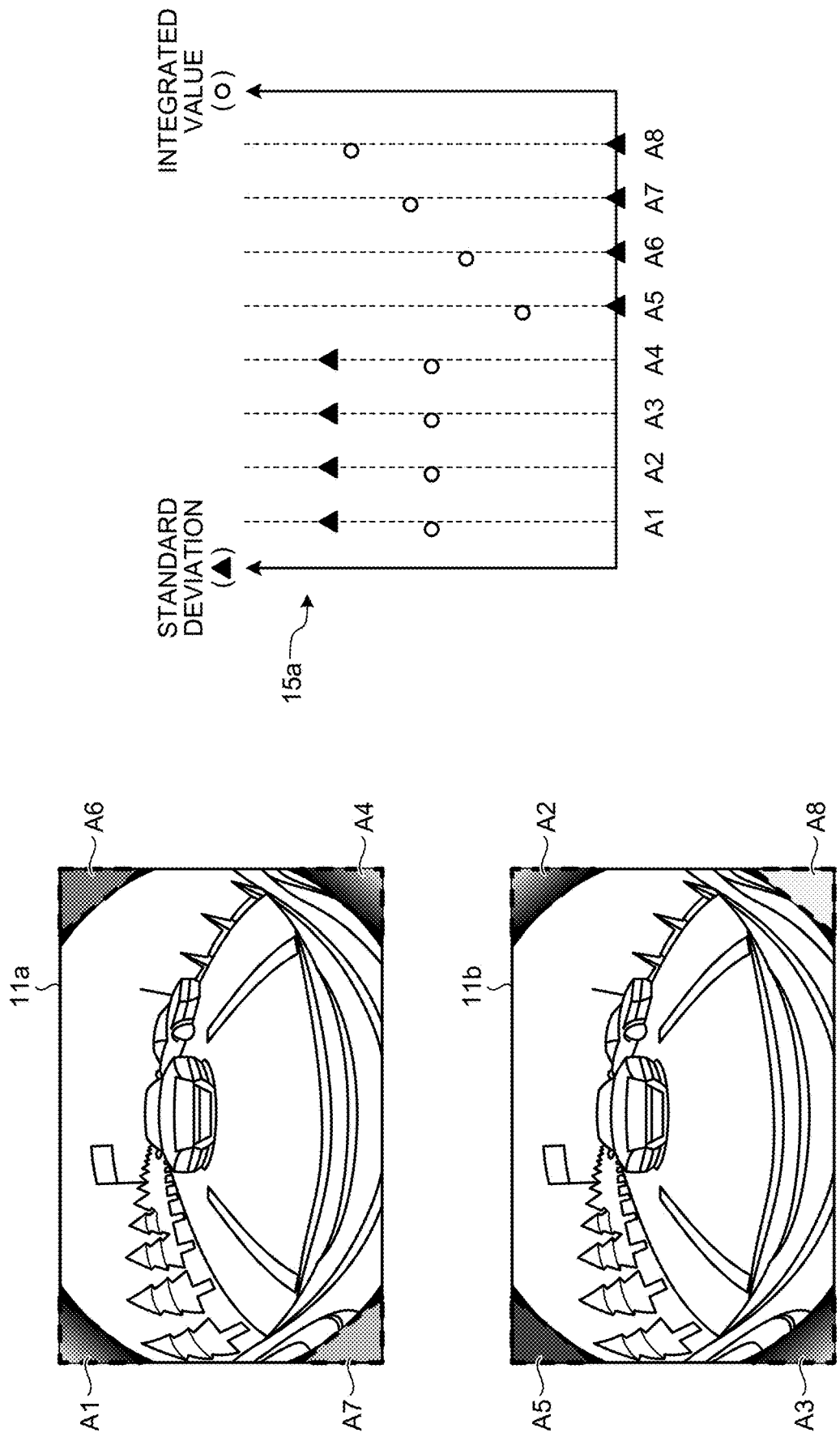
FIG. 6 is a diagram illustrating an example of distribution of standard deviations and integrated values when an image is normal.

FIG. 6 is a diagram illustrating an example of distribution of standard deviations and integrated values when an image is normal. The superimposition images 11a and 11b of FIG. 6 are transmitted through the signal transmission circuit 120 and reach the subsequent-stage image processing unit 140. A horizontal axis of distribution 15a represents the respective areas A1 to A8. A vertical axis on the left side is an axis corresponding to the magnitude of the standard deviation. The magnitude of the standard deviation of each of the areas A1 to A8 is indicated by a "triangular mark". A vertical axis on the right side is an axis corresponding to the magnitude of the integrated value. The magnitude of the integrated value of each of the areas A1 to A8 is indicated by a "circular mark". The distribution 15a in FIG. 6 is distribution in a case where there is no abnormality in the captured image.

Processing in which the determination unit 140b determines whether or not "image sticking" has occurred will be described. The determination unit 140b compares each of the standard deviations $\sigma_{A1}$ om to $\sigma_{A4}$ of the areas A1 to A4 with the threshold value Th2, and determines that the image sticking has occurred in the captured image in a case where three or more standard deviations are not equal to or more than the threshold value Th2. In a case where it is determined that the image sticking has occurred in the captured image, the determination unit 140b sets 1 in the image sticking bit area of the state determination result data 135a.

Figure 7:
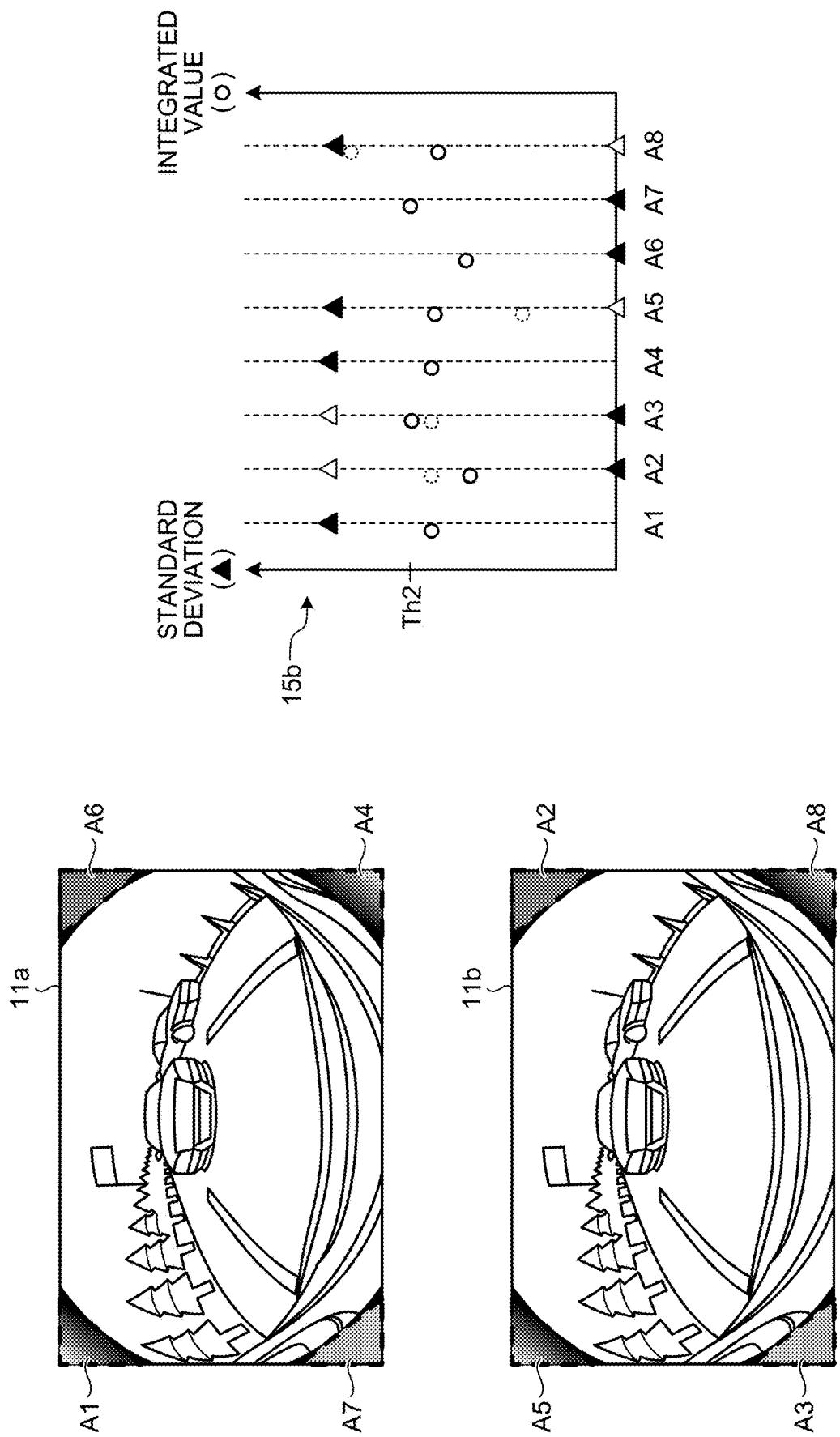
FIG. 7 is a diagram illustrating an example of distribution of standard deviations and integrated values when image sticking occurs.

FIG. 7 is a diagram illustrating an example of distribution of standard deviations and integrated values when the image sticking occurs. The superimposition images 11a and 11b of FIG. 7 are transmitted through the signal transmission circuit 120 and reach the subsequent-stage image processing unit 140. A horizontal axis of distribution 15b represents the respective areas A1 to A8. A vertical axis on the left side is an axis corresponding to the magnitude of the standard deviation. The magnitude of the standard deviation of each of the areas A1 to A8 is indicated by a "triangular mark". A vertical axis on the right side is an axis corresponding to the magnitude of the integrated value. The magnitude of the integrated value of each of the areas A1 to A8 is indicated by a "circular mark". The distribution 15b in FIG. 7 is distribution in a case where the image sticking occurs in the captured image. In the distribution 15b illustrated in FIG. 7, the standard deviations of the areas A2 and A3 are less than the threshold value Th2. In FIG. 7, a black triangular mark is an actual value of the standard deviation, and a solid circular mark is an actual integrated value. Note that, in a case where the actual value of the standard deviation is a value when the captured image is abnormal, a normal value (expected value) is indicated by a white triangular mark. In a case where the actual integrated value is a value when the captured image is abnormal, a normal value (expected value) is indicated by a dotted circular mark.

For example, when a failure occurs in the initial-stage image processing unit 110 or another signal processing IC, a memory, or a buffer (signal transmission circuit 120) between the initial-stage image processing unit 110 and the subsequent-stage image processing unit 140, it is considered that image sticking has occurred.

Processing in which the determination unit 140b determines whether or not "video masking" has occurred will be described. The determination unit 140b calculates the variation (variance) of the integrated values $I_{A5}$ to $I_{A8}$ of the areas A5 to A8. The determination unit 140b determines that the video masking has occurred in the captured image in a case where the calculated variance is less than a threshold value Th3. In a case where it is determined that the video masking has occurred in the captured image, the determination unit 140b sets 1 in the video masking bit area of the state determination result data 135a.

Figure 8:
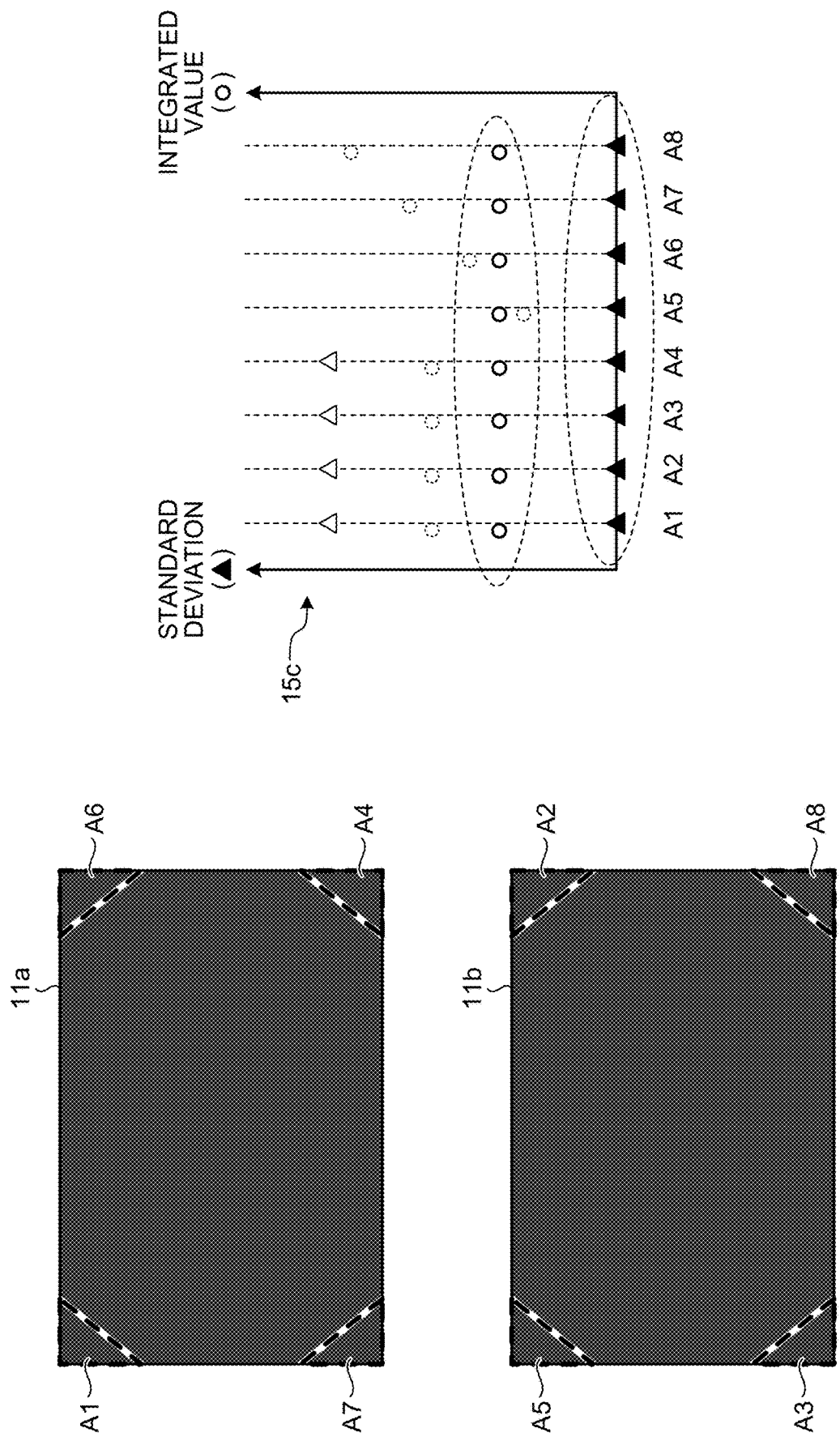
FIG. 8 is a diagram illustrating an example of distribution of standard deviations and integrated values when video masking occurs.

FIG. 8 is a diagram illustrating an example of distribution of standard deviations and integrated values when the video masking occurs. The superimposition images 11a and 11b of FIG. 8 are transmitted through the signal transmission circuit 120 and reach the subsequent-stage image processing unit 140. A horizontal axis of distribution 15c represents the respective areas A1 to A8. A vertical axis on the left side is an axis corresponding to the magnitude of the standard deviation. The magnitude of the standard deviation of each of the areas A1 to A8 is indicated by a "triangular mark". A vertical axis on the right side is an axis corresponding to the magnitude of the integrated value. The magnitude of the integrated value of each of the areas A1 to A8 is indicated by a "circular mark". The distribution 15c in FIG. 8 is distribution in a case where the video masking occurs in the captured image. In the distribution 15c illustrated in FIG. 8, there is little variation in the integrated values of the respective areas A1 to A8, and thus, the variance is small. In FIG. 8, a black triangular mark is an actual value of the standard deviation, and a solid circular mark is an actual integrated value. Note that, in a case where the actual value of the standard deviation is a value when the captured image is abnormal, a normal value (expected value) is indicated by a white triangular mark. In a case where the actual integrated value is a value when the captured image is abnormal, a normal value (expected value) is indicated by a dotted circular mark.

When the initial-stage image processing unit 110 or another signal processing IC between the initial-stage image processing unit 110 and the subsequent-stage image processing unit 140 detects an error, a single-color mask having different luminances may be superimposed on the image depending on the error state. This mask is generated as a video masking.

Processing in which the determination unit 140b determines whether or not "a tone change (grayscale jump)" has occurred will be described. The determination unit 140b determines that the tone change has occurred in the captured image in a case where differences between the integrated values of the areas A1 to A4 and the respective expected values are equal to or more than a threshold value Th4. For example, the determination unit 140b determines that the tone change has occurred in the captured image in a case where $|IA_{41}-e2_{41}|$, $|I_{42}-e2_{42}|$, $|I_{43}-e2_{43}|$, and $|I_{44}-e2_{44}|$ are all equal to or more than the threshold value Th4. In a case where it is determined that the tone change has occurred in the captured image, the determination unit 140b sets 1 in the tone change bit area of the state determination result data 135a.

Figure 9:
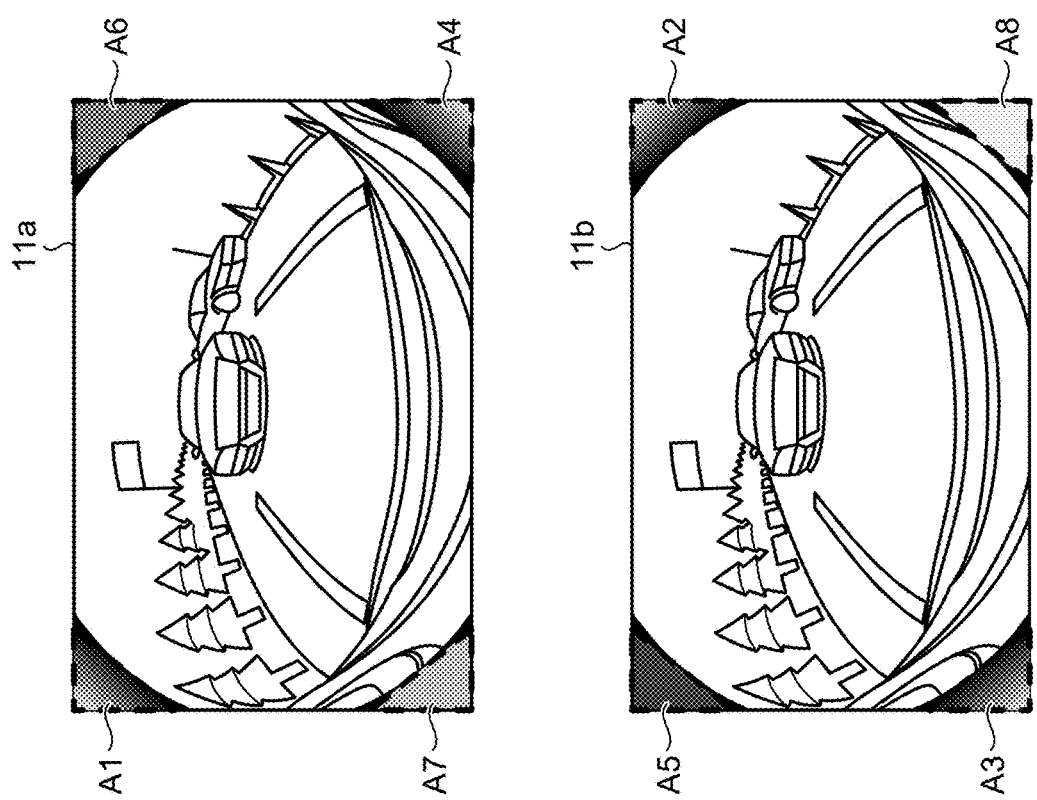
FIG. 9 is a diagram illustrating an example of distribution of standard deviations and integrated values when a tone change occurs.

FIG. 9 is a diagram illustrating an example of distribution of standard deviations and integrated values when the tone change occurs. The superimposition images 11a and 11b of FIG. 9 are transmitted through the signal transmission circuit 120 and reach the subsequent-stage image processing unit 140. A horizontal axis of distribution 15d represents the respective areas A1 to A8. A vertical axis on the left side is an axis corresponding to the magnitude of the standard deviation. The magnitude of the standard deviation of each of the areas A1 to A8 is indicated by a "triangular mark". A vertical axis on the right side is an axis corresponding to the magnitude of the integrated value. The magnitude of the integrated value of each of the areas A1 to A8 is indicated by a "circular mark". The distribution 15d in FIG. 9 is distribution in a case where the tone change occurs in the captured image. In the distribution 15d illustrated in FIG. 9, the integrated values of the areas A1 to A4 are all equal to or more than the threshold value Th4. In FIG. 9, a black triangular mark is an actual value of the standard deviation, and a solid circular mark is an actual integrated value. Note that, in a case where the actual integrated value is a value when the captured image is abnormal, a normal value (expected value) is indicated by a dotted circular mark.

For example, in a case where a failure occurs in the signal transmission circuit 120 (or another IC) between the initial-stage image processing unit 110 and the subsequent-stage image processing unit 140, or a video signal line is short-circuited or open due to a solder crack caused by deterioration over time, it is considered that the tone change has occurred.

Processing in which the determination unit 140b determines whether or not "noise superimposition" has occurred will be described. The determination unit 140b determines that noise superimposition has occurred in the captured image in a case where the standard deviations of the areas A5 to A8 are all equal to or more than a threshold value Th5. In a case where it is determined that the noise superimposition has occurred in the captured image, the determination unit 140b sets 1 in the noise superimposition bit area of the state determination result data 135a.

Figure 10:
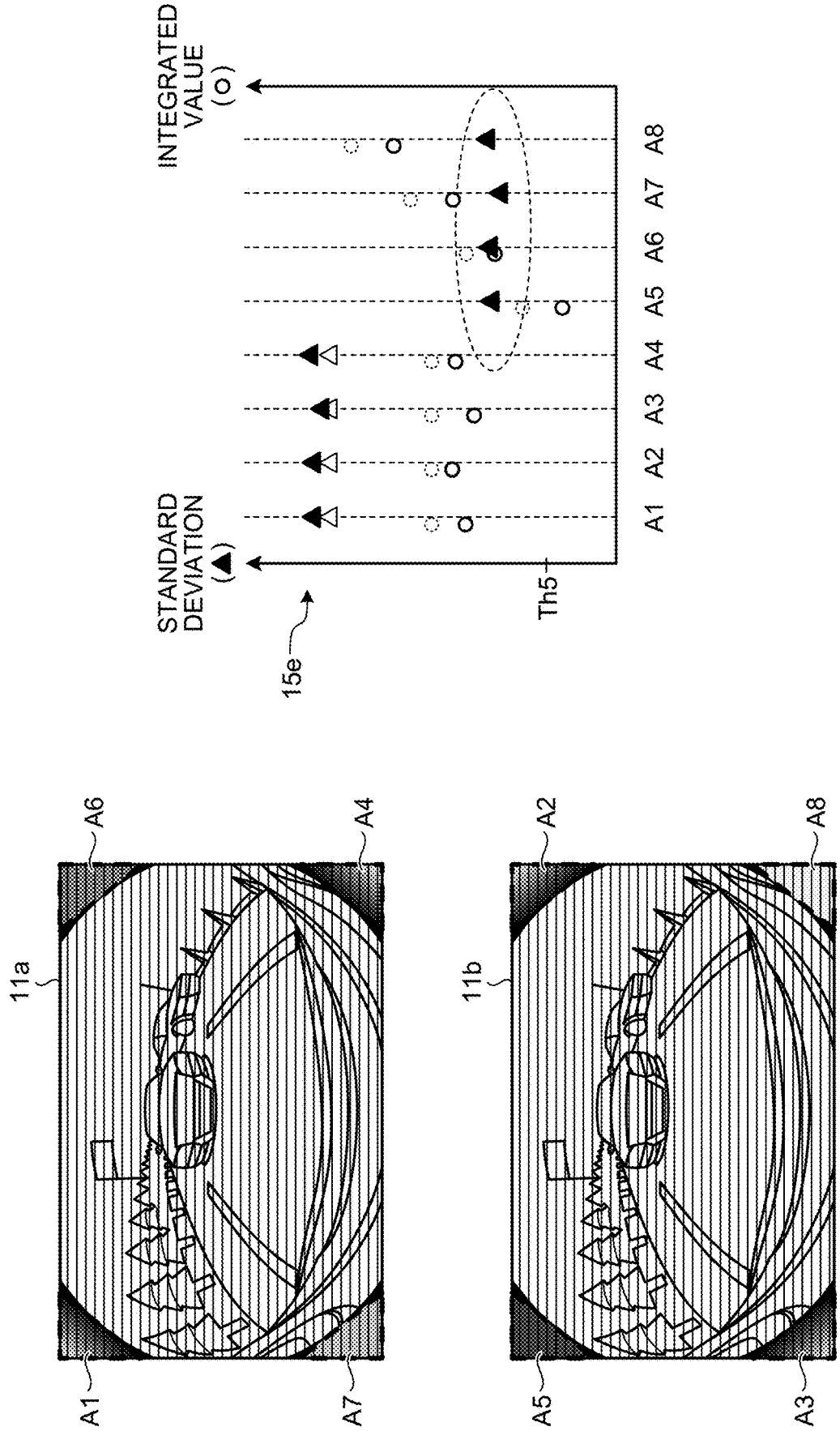
FIG. 10 is a diagram illustrating an example of distribution of standard deviations and integrated values when noise superimposition occurs.

FIG. 10 is a diagram illustrating an example of distribution of standard deviations and integrated values when the noise superimposition occurs. The superimposition images 11a and 11b of FIG. 10 are transmitted through the signal transmission circuit 120 and reach the subsequent-stage image processing unit 140. A horizontal axis of distribution 15e represents the respective areas A1 to A8. A vertical axis on the left side is an axis corresponding to the magnitude of the standard deviation. The magnitude of the standard deviation of each of the areas A1 to A8 is indicated by a "triangular mark". A vertical axis on the right side is an axis corresponding to the magnitude of the integrated value. The magnitude of the integrated value of each of the areas A1 to A8 is indicated by a "circular mark". The distribution 15e in FIG. 10 is distribution in a case where the noise superimposition occurs in the captured image. In the distribution 15e illustrated in FIG. 10, the standard deviations of the areas A5 to A8 are all equal to or more than the threshold value Th5. In FIG. 7, a black triangular mark is an actual value of the standard deviation, and a solid circular mark is an actual integrated value. Note that, in a case where the actual value of the standard deviation is a value when the captured image is abnormal, a normal value (expected value) is indicated by a white triangular mark. In a case where the actual integrated value is a value when the captured image is abnormal, a normal value (expected value) is indicated by a dotted circular mark.

It is considered that the noise superimposition occurs due to an influence of noise from another signal line or noise such as static electricity during signal transmission.

As described above, in a case where it is determined that there is an abnormality in the captured image, the determination unit 140b performs processing of determining whether or not image sticking, video masking, a tone change, and noise superimposition have occurred, and sets a bit in the state determination result data 135a. The determination unit 140b outputs the state determination result data 135a to the notification unit 140d.

Return to the description of FIG. 1. The analysis processing unit 140c is a processing unit that acquires the superimposition images 11a and 11b from the image input unit 140a and performs various sensing processing on an area (hereinafter, referred to as a sensing area) other than the unused areas among the areas of the superimposition images 11a and 11b.

For example, the analysis processing unit 140c detects pedestrians, other vehicles, and the like by detecting edges and the like from the sensing area and performing pattern matching and the like. The analysis processing unit 140c may output a sensing result to a display device or the like of an in-vehicle camera system. Further, the analysis processing unit 140c may notify a control device of the sensing result, the control device performing a brake control.

The notification unit 140d is a processing unit that makes various notifications and responses on the basis of the state determination result data 135a. The notification unit 140d refers to the state determination result data 135a and causes the display device or the like of the in-vehicle camera system to display a recognition error message in a case where "1" is set in the state abnormality bit area. For example, the notification unit 140d displays a message "<Recognition Error> Please check the surroundings carefully while driving".

Further, the notification unit 140d refers to the state determination result data 135a, and in a case where "1" is set in the state abnormality bit area, the notification unit 140d performs each processing by referring to each of other bit areas. Hereinafter, processing performed by the notification unit 140d according to the bits of the image sticking bit area, the video masking bit area, the tone change bit area, and the noise superimposition bit area will be described.

Processing performed by the notification unit 140d in a case where 1 is set in the "image sticking bit area" will be described. In a case where "1" is set in the image sticking bit area, the notification unit 140d outputs a reset command to the initial-stage image processing unit 110. The notification unit 140d may output the reset command to the initial-stage image processing unit 110 via the signal transmission circuit 120, or may output the reset command to the initial-stage image processing unit 110 via another path.

Processing performed by the notification unit 140d in a case where "1" is set in the "video masking bit area" will be described. In a case where "1" is set in the video masking bit area, the notification unit 140d acquires an integrated value from the integrated value area of the state determination result data 135a and performs processing corresponding to the integrated value. Further, the notification unit 140d outputs the reset command to the initial-stage image processing unit 110.

Processing performed by the notification unit 140d in a case where "1" is set in the "tone change bit area" will be described. The notification unit 140d causes the display device of the in-vehicle camera system to display a message "the camera may be out of order".

Processing performed by the notification unit 140d in a case where "1" is set in the "noise superimposition bit area" will be described. The notification unit 140d skips the processing regardless of whether or not "1" is set in the noise superimposition bit area.

Meanwhile, the notification unit 140d determines that an unexpected error has occurred in a case where "1" is set in the state abnormality bit area, and the bits of the image sticking bit area, the video masking bit area, the tone change bit area, and the noise superimposition bit area are all "0" in the state determination result data 135a. In this case, the notification unit 140d causes the display device or the like of the in-vehicle camera system to display a message "an unexpected error has occurred".

1-2. Processing Procedure of Imaging Device According to First Embodiment

Figure 11:
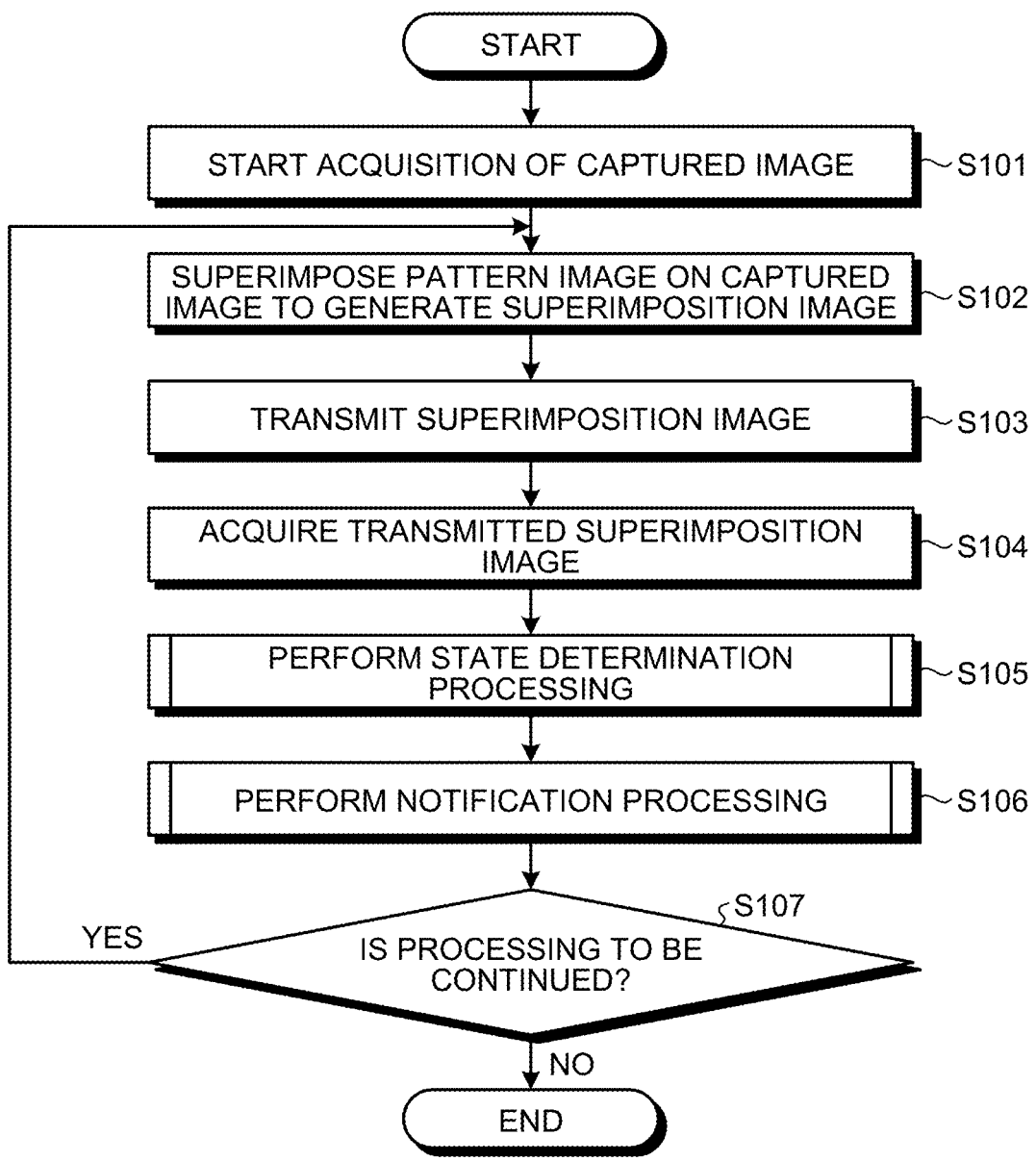
FIG. 11 is a flowchart illustrating a processing procedure of the image processing device according to the first embodiment.

FIG. 11 is a flowchart illustrating a processing procedure of the imaging device according to the first embodiment. As illustrated in FIG. 11, the imaging element unit 110a of the imaging device 100 starts acquisition of a captured image (Step S101).

The superimposition unit 110b of the imaging device 100 superimposes a pattern image on the captured image to generate a superimposition image (Step S102). The image output unit 110c of the imaging device 100 transmits the superimposition image to the image processing unit 130 and the subsequent-stage image processing unit 140 (Step S103).

The image input unit 140a of the imaging device 100 acquires the superimposition image transmitted through the signal transmission circuit 120 (Step S104). The determination unit 140b of the imaging device 100 performs state determination processing (Step S105). The notification unit 140d of the imaging device 100 performs notification processing (Step S106).

In a case of continuing the processing (Step S107, Yes), the imaging device 100 proceeds to Step S102. In a case of not continuing the processing (Step S107, No), the imaging device 100 ends the processing.

Figure 12:
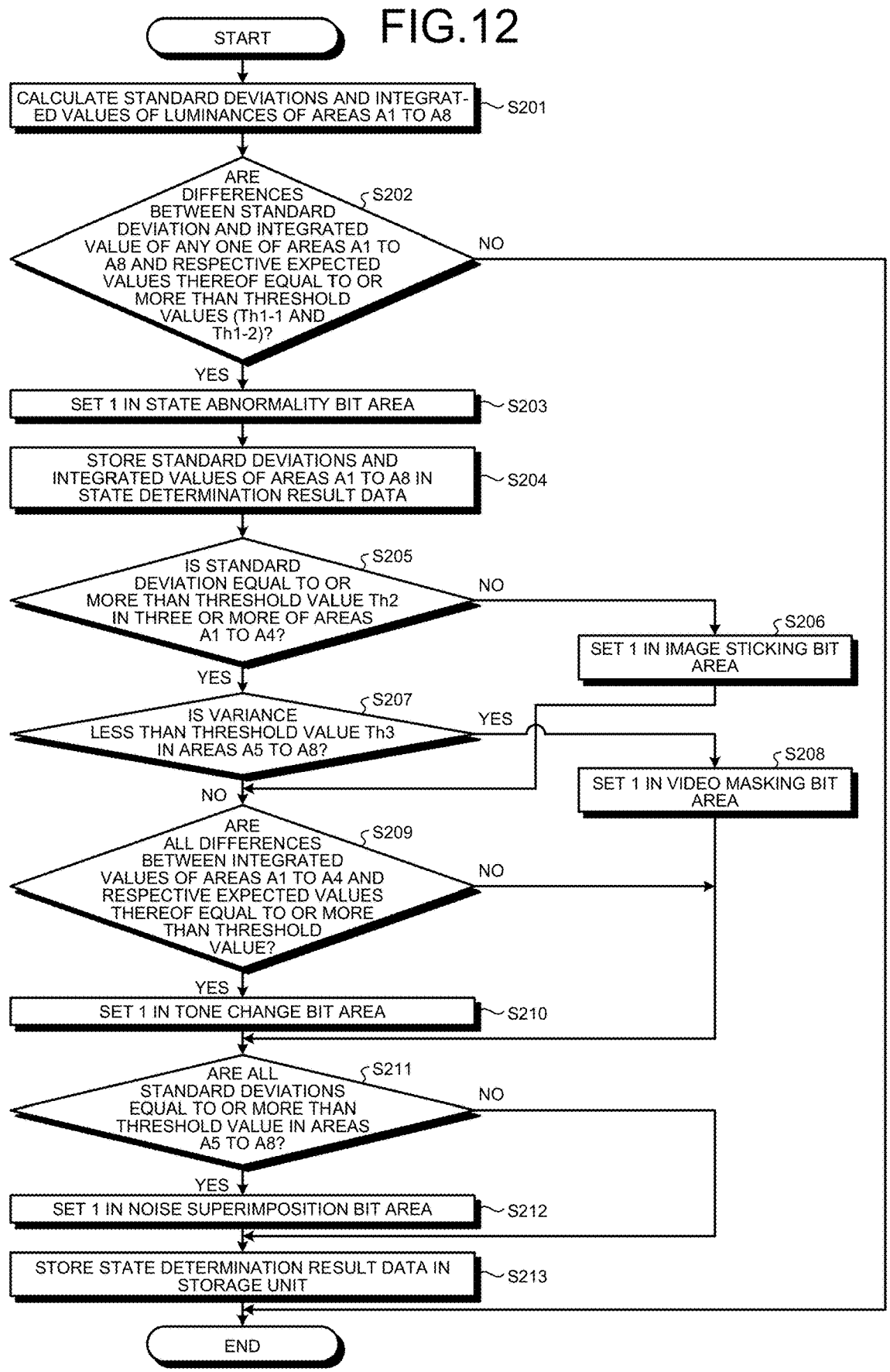
FIG. 12 is a flowchart illustrating a processing procedure of state determination processing.

Subsequently, a processing procedure of the state determination processing performed by the determination unit 140b in Step S105 of FIG. 11 will be described. FIG. 12 is a flowchart illustrating the processing procedure of the state determination processing. As illustrated in FIG. 12, the determination unit 140b of the imaging device 100 calculates standard deviations of the luminance values and integrated values of the luminance values of the areas A1 to A8 from the superimposition images 11a and 11b (Step S201).

The determination unit 140b determines whether or not differences between the standard deviation and the integrated value of any one of the areas A1 to A8 and the respective expected values thereof are equal to or more than the threshold values (Th1-1 and Th1-2) (Step S202). In a case where the differences between the standard deviation and the integrated value of any one of the areas A1 to A8 and the respective expected values thereof are not equal to or more than the threshold values Th (Step S202, No), the determination unit 140b ends the state determination processing.

On the other hand, in a case where the differences between the standard deviation and the integrated value of any one of the areas A1 to A8 and the respective expected values thereof are equal to or more than the threshold values Th (Step S202, Yes), the determination unit 140b sets 1 in the state abnormality bit area (Step S203). The determination unit 140b stores the standard deviations and integrated values of the areas A1 to A8 in the state determination result data 135a (Step S204).

The determination unit 140b determines whether or not the standard deviation is equal to or more than the threshold value Th2 in three or more of the areas A1 to A4 (Step S205). In a case where the standard deviation is not equal to or more than the threshold value Th2 in three or more of the areas A1 to A4 (Step S205, No), the determination unit 140b sets 1 in the image sticking bit area (Step S206), and proceeds to Step S209.

On the other hand, in a case where the standard deviation is equal to or more than the threshold value Th2 in three or more of the areas A1 to A4 (Step S205, Yes), the determination unit 140b proceeds to Step S207. The determination unit 140b determines whether or not a variance of the integrated values is less than the threshold value Th3 in the areas A5 to A8 (Step S207).

In a case where the variance of the integrated values is less than the threshold value Th3 (Step S207, Yes), the determination unit 140b sets 1 in the video masking bit area (Step S208), and proceeds to Step S211.

On the other hand, in a case where the variance of the integrated values is not less than the threshold value Th3

(Step S207, No), the determination unit 140b proceeds to Step S209. The determination unit 140b determines whether or not the differences between the integrated values of the areas A1 to A4 and the respective expected values thereof are all equal to or more than the threshold value Th4 (Step S208).

In a case where the differences between the integrated values of the areas A1 to A4 and the respective expected values thereof are not all equal to or more than the threshold value Th4 (Step S209, No), the determination unit 140b proceeds to Step S211. In a case where the differences between the integrated values of the areas A1 to A4 and the respective expected values thereof are all equal to or more than the threshold value Th4 (Step S209, Yes), the determination unit 140b sets 1 in the tone change bit area (Step S210) and proceeds to Step S211.

Meanwhile, in a case where the differences between the integrated values of the areas A5 to A8 and the respective expected values thereof are all equal to or more than the threshold value Th4 (Step S211, Yes), the determination unit 140b sets 1 in the noise superimposition bit area (Step S212). The determination unit 140b stores the state determination result data 135a in the storage unit 135 (Step S213).

Figure 13:
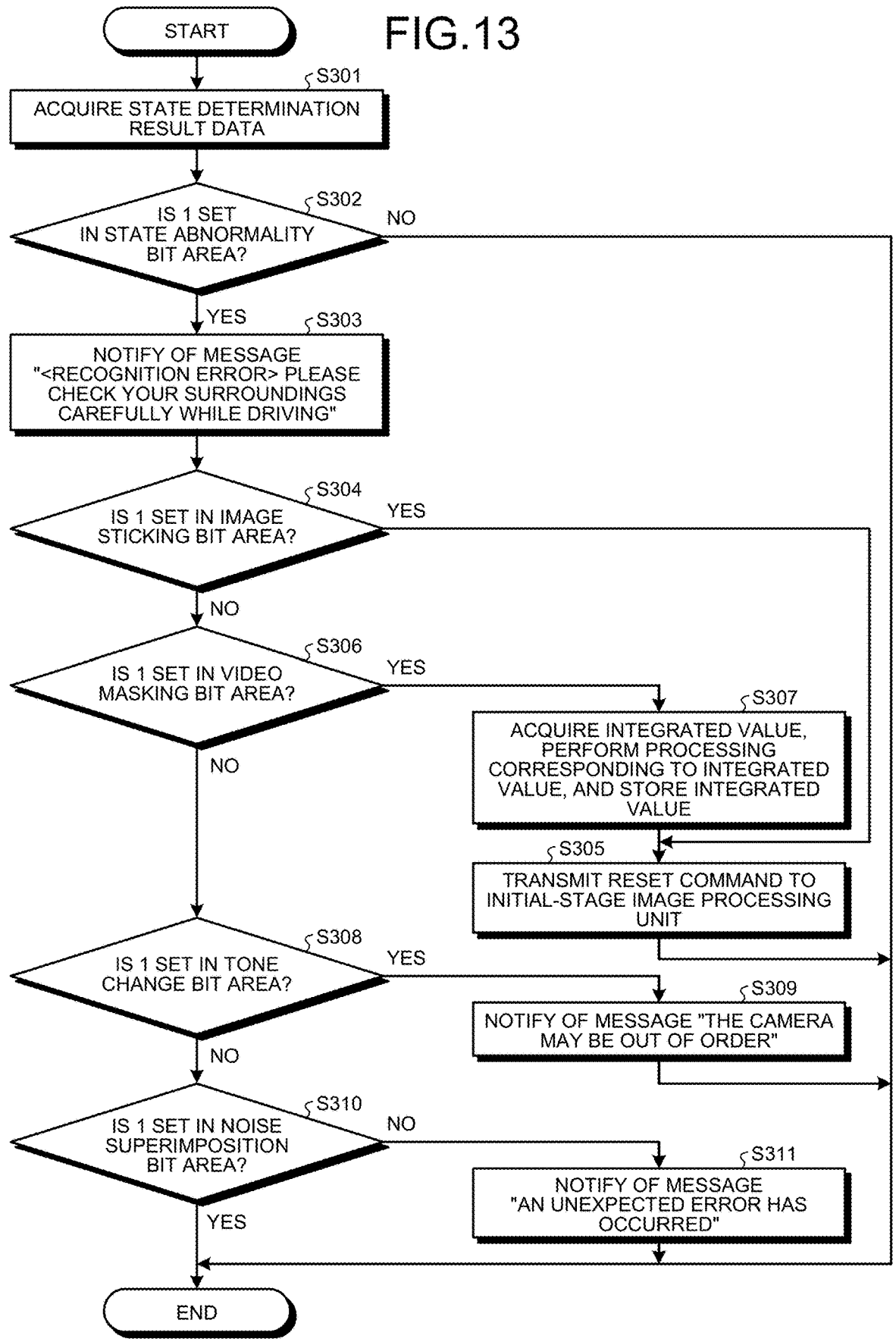
FIG. 13 is a flowchart illustrating a processing procedure of notification processing.

Subsequently, a processing procedure of the notification processing performed by the determination unit 140b in Step S106 of FIG. 11 will be described. FIG. 13 is a flowchart illustrating the processing procedure of the notification processing. The notification unit 140d of the imaging device 100 acquires the state determination result data 135a (Step S301).

The notification unit 140d determines whether or not 1 is set in the state abnormality bit area (Step S302). In a case where 1 is not set in the state abnormality bit area (Step S302, No), the notification unit 140d ends the notification processing.

On the other hand, in a case where 1 is set in the state abnormality bit area (Step S302, Yes), the notification unit 140d notifies of the message "<Recognition Error> Please check the surroundings carefully while driving" (Step S303).

The notification unit 140d determines whether or not 1 is set in the image sticking bit area (Step S304). In a case where 1 is set in the image sticking bit area (Step S304, Yes), the notification unit 140d transmits a reset command to the initial-stage image processing unit 110 (Step S305).

On the other hand, in a case where 1 is not set in the image sticking bit area (Step S304, No), the notification unit 140d proceeds to Step S306. The notification unit 140d determines whether or not 1 is set in the video masking bit area (Step S306). In a case where 1 is set in the video masking bit area (Step S306, Yes), the notification unit 140d acquires the integrated value, performs processing according to the integrated value, and stores the integrated value (Step S307), and then proceeds to Step S305. In Step 307, whether the error is a flash memory read error or a pixel error is determined on the basis of error determination information according to the integrated value. In a case where the flash memory read error occurs, the read processing of the flash memory is performed again, and the processing after Step S301 is performed again. Then, in a case where the flash memory read error repeatedly occurs, the notification unit 140d stores the integrated value and then proceeds to S305 to perform reset processing. In a case of the pixel error, the notification unit 140d stores the integrated value and then proceeds to S305 to perform the reset processing. At the time of error determination, error determination information indicating the type of error corresponding to the integrated value is prepared in advance by experiment or learning.

In a case where 1 is not set in the video masking bit area (Step S306, No), the notification unit 140d proceeds to Step S308. The notification unit 140d determines whether or not 1 is set in the tone change bit area (Step S308). In a case where 1 is set in the tone change bit area (Step S308, Yes), the notification unit 140d notifies of the message "the camera may be out of order" (Step S309).

In a case where 1 is not set in the tone change bit area (Step S308, No), the notification unit 140d proceeds to Step S310. The notification unit 140d determines whether or not 1 is set in the noise superimposition bit area (Step S310). In a case where 1 is set in the tone change bit area (Step S310, Yes), the notification unit 140d ends the notification processing.

On the other hand, in a case where 1 is not set in the tone change bit area (Step S308, No), the notification unit 140d notifies of the message "an unexpected error has occurred" (Step S311).

1-3. Effects of Imaging Device According to First Embodiment

As described above, the imaging device 100 according to the first embodiment generates a superimposition image in which images are superimposed on unused areas of a captured image, and determines a state of the captured image on the basis of the characteristics of the areas on which the images are superimposed in the superimposition image transmitted from the initial-stage image processing unit 110 to the subsequent-stage image processing unit 140. As a result, in a case where an unintended state change occurs in the captured image transmitted from the initial-stage image processing unit 110 for some reason, it is possible to determine the state change. By determining the state change, it is possible to perform an operation according to a reset command transmitted to the initial-stage image processing unit 110 and to alert the driver.

The imaging device 100 generates a superimposition image in which images are superimposed on unused areas outside the image circle among the areas of the captured image. Therefore, it is possible to determine whether or not there is an abnormality in the captured image without affecting various image processing for the captured image.

The imaging device 100 superimposes images on unused areas that are not sensing targets of the analysis processing unit 140c among the areas of the captured image to generate a superimposition image. Therefore, it is possible to determine whether or not there is an abnormality in the captured image without affecting the analysis processing performed by the analysis processing unit 140c.

The imaging device 100 superimposes single-luminance images or gradation images on unused areas of the captured image to generate a superimposition image. By using such a superimposition image, when an abnormality occurs in the captured image, it is possible to identify the factor of the state abnormality.

The imaging device 100 superimposes images on four corners corresponding to the unused areas of the captured image to generate a superimposition image. Therefore, a plurality of single-luminance images or gradation images having different luminances can be included in the superimposition image, whereby it is possible to identify the factor of the state abnormality.

The imaging device 100 determines the state of the captured image on the basis of the superimposition image transmitted through the signal transmission circuit 120 including a buffer, a memory, or various signal processing ICs. Therefore, it is possible to determine the state abnormality occurring due to transmission through the signal transmission circuit 120.

The imaging device 100 calculates standard deviations and integrated values of luminances on the basis of the single-luminance images or the gradation images superimposed in the superimposition image, and determines the state of the captured image on the basis of the standard deviations and the integrated values. As a result, it is possible to determine a specific factor among a plurality of state abnormality factors. For example, the imaging device 100 can determine a state abnormality such as image sticking, video masking, a tone change, or noise superimposition.

The imaging device 100 makes various notifications on the basis of a determination result of the state determination result data 135a. Therefore, it is possible to notify of the state of the captured image, or the factor when there is an abnormality.

2. Modified Example of First Embodiment

2-1. Modified Example of Superimposition Unit of First Embodiment

Figure 14:
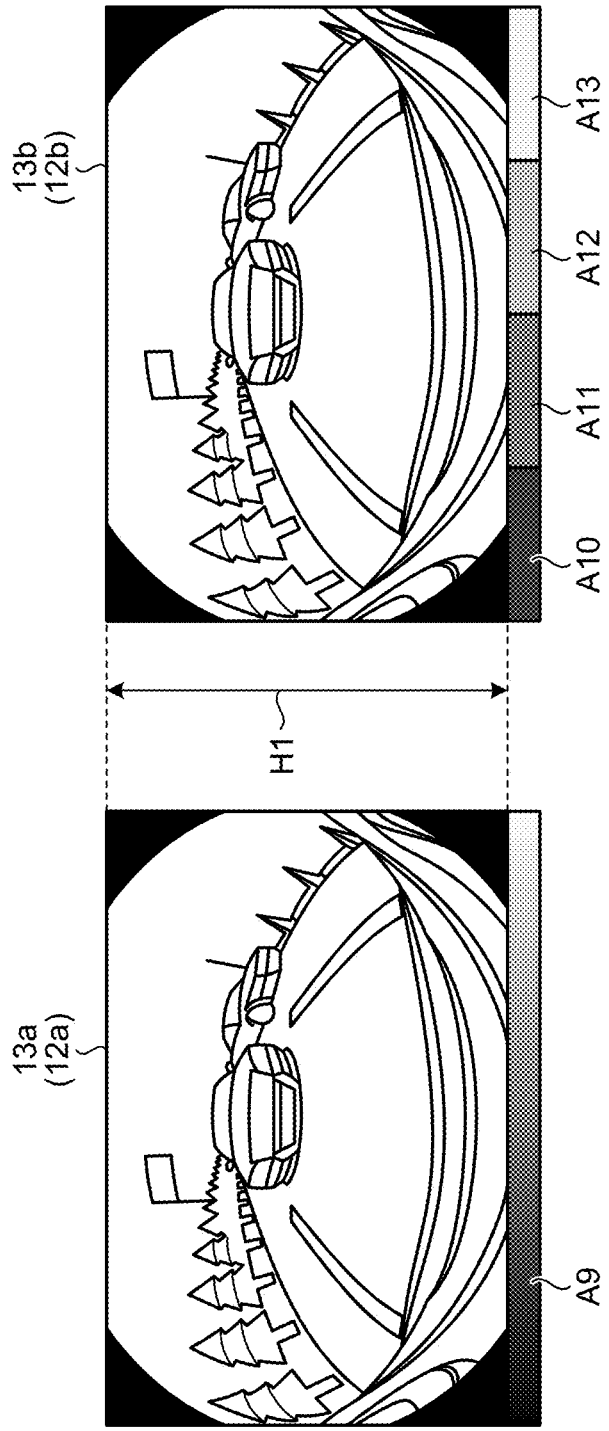
FIG. 14 is a diagram for describing other processing performed by the superimposition unit.

The superimposition unit 110b described in the above-described embodiment superimposes the pattern images on four corners of the captured image, but the present disclosure is not limited thereto. The superimposition unit 110b may superimpose a pattern image on an edge of an unused area. FIG. 14 is a diagram for describing other processing performed by the superimposition unit. Further, the pattern image may be a pattern other than the above. Further, the check image may be an image other than the pattern image.

In the example illustrated in FIG. 14, superimposition images 13a and 13b are illustrated. The superimposition image 13a is obtained by superimposing a gradation image on an area A9 corresponding to an unused area of the 2n−1-th (n is a natural number) captured image 12a. In the superimposition image 13b, single-luminance images are superimposed on areas A10, A11, A12, and A13 corresponding to unused areas of the 2n-th (n is a natural number) captured image 12b. Luminance values of the single luminances superimposed on A10, A11, A12, and A13 are different from one another. In FIG. 14, H1 indicates a vertical width of the image circle. The superimposition unit 110b sets the areas A9 to A13 as areas that are not included in H1. The superimposition unit 110b generates the superimposition images 13a and 13b, and the image output unit 110c sequentially transmits the superimposition images 13a and 13b to the signal transmission circuit 120.

The determination unit 140b determines the state of the captured image on the basis of the superimposition images 13a and 13b. For example, the determination unit 140b uses a standard deviation and an integrated value of the luminance values of the area A9, instead of the areas A1, A2, A3, and A4 described with reference to FIGS. 2 and 3. The determination unit 140b uses standard deviations and integrated values of the areas A10, A11, A12, and A13, instead of the areas A5, A6, A7, and A8 described with reference to FIGS. 2 and 3. Further, the determination unit 140b may determine the state of the captured image on the basis of other determination criteria set by a manager.

2-2. Modified Example of Determination Unit of First Embodiment (1)

In the determination unit 140b described in the above-described embodiment, the standard deviations of the pattern images included in the areas A1 to A8 are calculated to determine the state of the captured image, but a signal-to-noise ratio (S/N) may be used instead of the standard deviation. For example, the determination unit 140b calculates the S/N on the basis of Equation (4). In Equation (4), "σ" is the standard deviation calculated by Equation (1). "$Y_{AVE}$" indicates an average value of the luminance values of all pixels in an area (within a target area) whose standard deviation is calculated.

$$S/N = 20 \log \frac{Y_{Ave}}{\sigma} [dB] \qquad (2)$$

Further, the determination unit 140b may determine the state of the captured image by using an average value of the luminance values or a checksum value, instead of calculating the integrated value of the pattern image.

2-3. Modified Example of Determination Unit of First Embodiment (2)

The determination unit 140b described in the above-described embodiment determines image sticking, video masking, a tone change, and noise superimposition as abnormal states of the captured image, but the present disclosure is not limited thereto. For example, the determination unit 140b can also detect "image inversion" as an abnormal state of the captured image.

For example, the determination unit 140b determines that the image inversion has occurred in the captured image in a case where differences between the standard deviations $\sigma_{A1}$ to $\sigma_{A4}$ of the areas A1 to A4 and the expected values $e1_{A5}$ to $e1_{A8}$ of the standard deviations of the areas A5 to A8 are each less than a threshold Th6. In a case where it is determined that the image inversion has occurred in the captured image, the determination unit 140b sets 1 in an image inversion bit area (not illustrated) of the state determination result data 135a.

Figure 15:
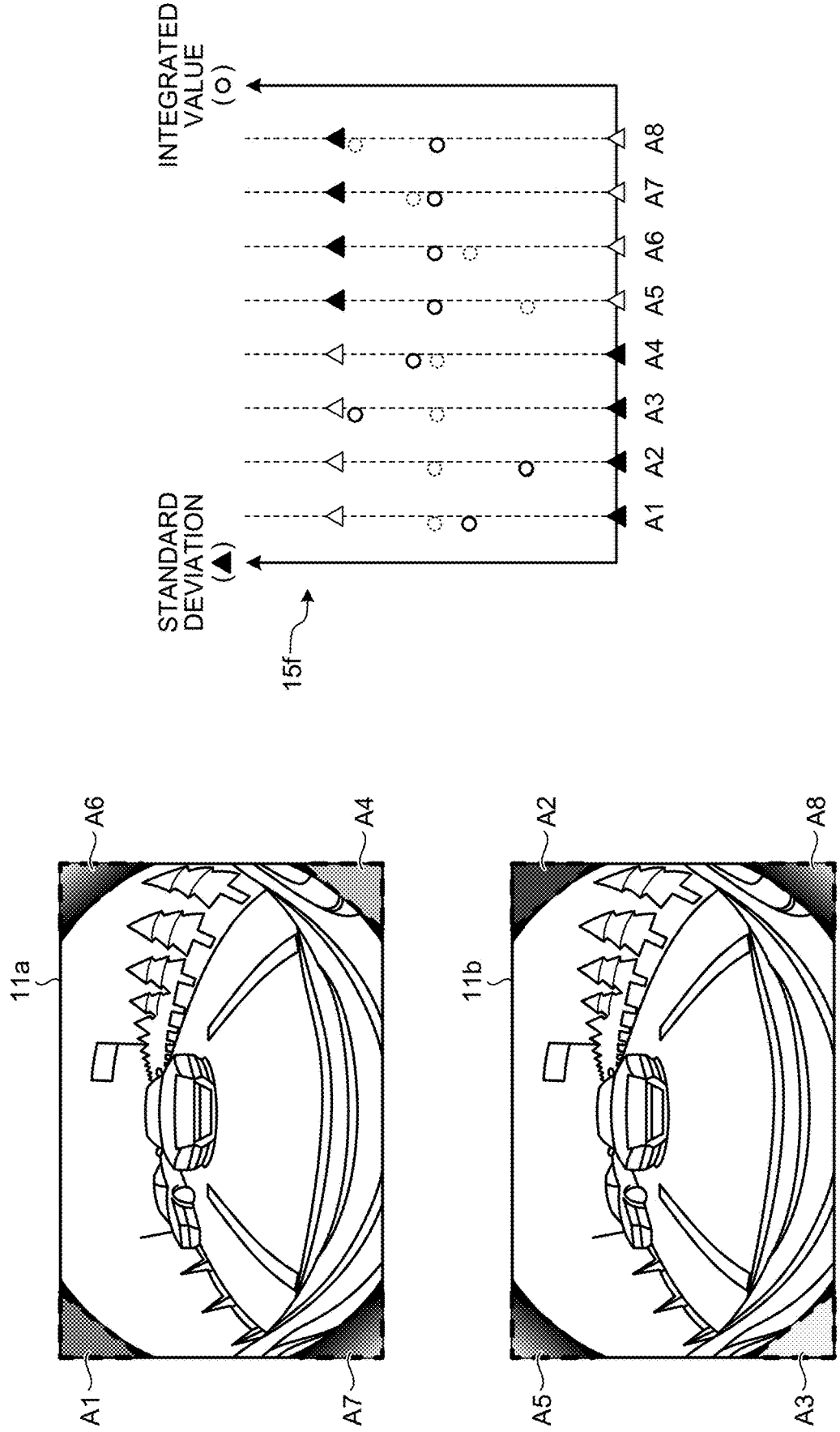
FIG. 15 is a diagram illustrating an example of distribution of standard deviations and integrated values when image inversion occurs.

FIG. 15 is a diagram illustrating an example of distribution of standard deviations and integrated values when the image inversion occurs. The superimposition images 11a and 11b of FIG. 15 are transmitted through the signal transmission circuit 120 and reach the subsequent-stage image processing unit 140. A horizontal axis of distribution 15f represents the respective areas A1 to A8. A vertical axis on the left side is an axis corresponding to the magnitude of the standard deviation. The magnitude of the standard deviation of each of the areas A1 to A8 is indicated by a "triangular mark". A vertical axis on the right side is an axis corresponding to the magnitude of the integrated value. The magnitude of the integrated value of each of the areas A1 to A8 is indicated by a "circular mark". The distribution 15f in FIG. 15 is distribution in a case where the image inversion occurs in the captured image. In the distribution 15f illustrated in FIG. 15, the expected values of the standard deviations and integrated values of the areas A1 to A4 and the expected values of the standard deviations and integrated values of the areas A5 to A8 are laterally inverted. In FIG. 15, a black triangular mark is an actual value of the standard deviation, and a solid circular mark is an actual integrated value. Note that, in a case where the actual value of the standard deviation is a value when the captured image is abnormal, a normal value (expected value) is indicated by a white triangular mark. In a case where the actual integrated value is a value when the captured image is abnormal, a normal value (expected value) is indicated by a dotted circular mark.

3. Second Embodiment

Figure 16:
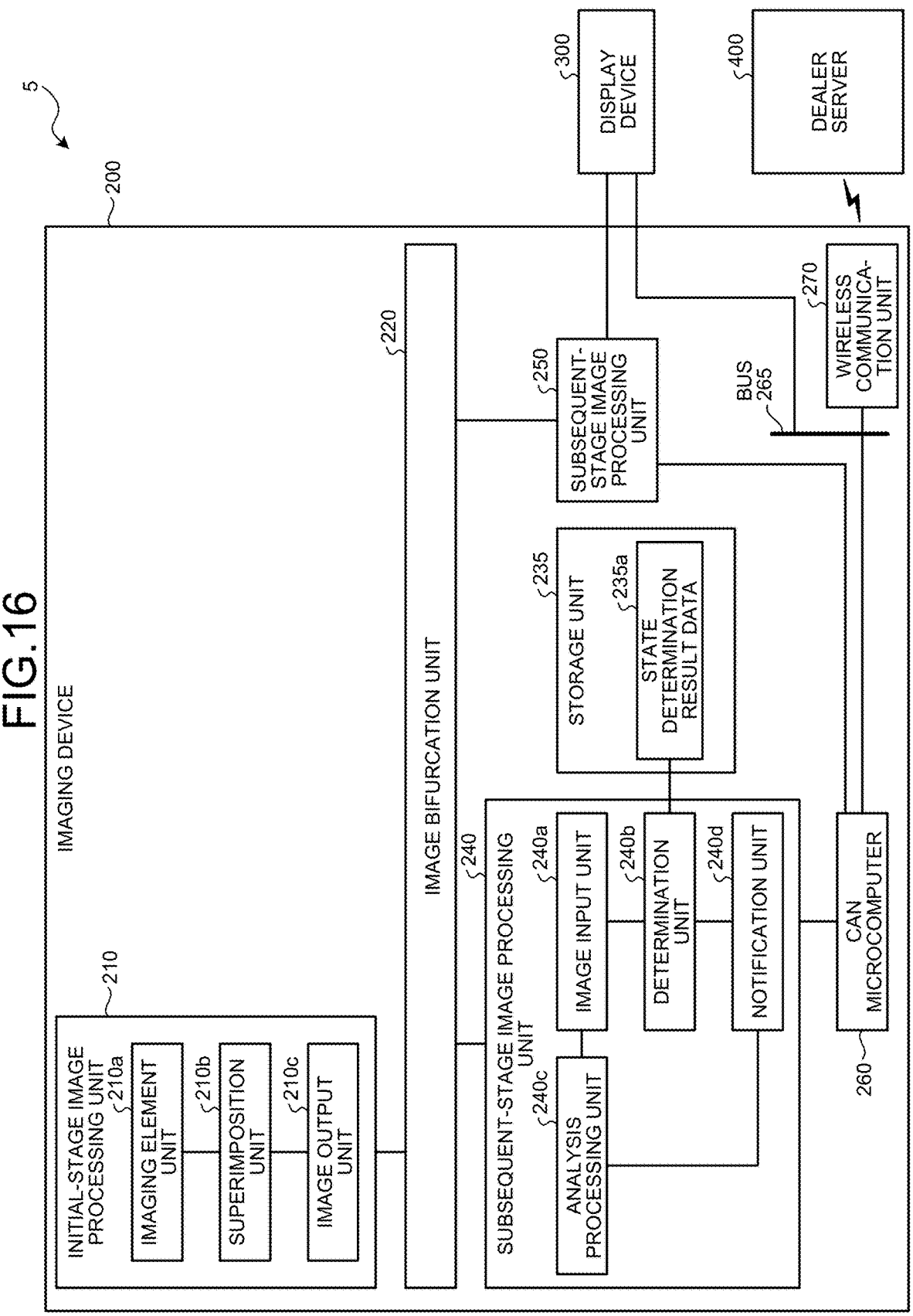
FIG. 16 is a diagram illustrating an example of a system according to a second embodiment.

3-1. Configuration of Image Processing System According to Second Embodiment FIG. 16 is a diagram illustrating an example of an image processing system according to a second embodiment. As illustrated in FIG. 16, an image processing system 5 includes an imaging device 200, a display device 300, and a dealer server 400.

The imaging device 200 is a device that determines a state of a captured image. The imaging device 200 determines the state of the captured image, and transmits state determination result data 135a to the dealer server 400 when an abnormality is detected. Further, the imaging device 200 outputs a message for dealing with the state abnormality to the display device 300 and causes the display device 300 to display the message.

The display device 300 is a device that displays information on the captured image output from the imaging device 200. Further, the display device 300 displays a message output from the imaging device 200. For example, the display device 300 corresponds to a display device such as a liquid crystal display of a car navigation system.

The dealer server 400 receives the state determination result data 235a transmitted from the imaging device 200, and holds the history of the state determination result data 235a. The dealer server 400 provides various services by using the history of the state determination result data 235a.

3-2. Functional Configuration of Imaging Device According to Second Embodiment Subsequently, an example of a functional configuration of the imaging device according to the second embodiment will be described. As illustrated in FIG. 16, the imaging device 200 includes an initial-stage image processing unit 210, an image bifurcation unit 220, a storage unit 235, subsequent-stage image processing units 240 and 250, a controller area network (CAN) microcomputer 260, a bus 265, and a wireless communication unit 270.

The initial-stage image processing unit 210, the image bifurcation unit 220, the subsequent-stage image processing units 240 and 250, and the CAN microcomputer 260 are each implemented by, for example, an IC or the like.

The initial-stage image processing unit 210 is connected to the image bifurcation unit 220. The subsequent-stage image processing units 240 and 250 are connected to the image bifurcation unit 220. The CAN microcomputer 260 is connected to the subsequent-stage image processing units 240 and 250. The CAN microcomputer 260 is connected to the wireless communication unit 270 via the bus 265. Further, the CAN microcomputer 260 is connected to the initial-stage image processing unit 210, the image bifurcation unit 220, and the subsequent-stage image processing units 240 and 250 by a signal line (not illustrated).

The initial-stage image processing unit 210 is a device corresponding to an image sensor such as a CMOS or CCD, or the like. For example, the initial-stage image processing unit 210 includes an imaging element unit 210a, a superimposition unit 210b, and an image output unit 210c. The initial-stage image processing unit 210 restarts when receiving a reset command from the CAN microcomputer.

The imaging element unit 210a is a processing unit that generates (acquires) a video signal (captured image) by converting light incident through a lens of a camera (not illustrated) into an electric signal. The imaging element unit 210a outputs the captured image to the superimposition unit 210b.

The superimposition unit 210b is a processing unit that generates a superimposition image in which images are superimposed on unused areas of the captured image. The superimposition unit 210b generates superimposition images 11a and 11b in the same manner as the superimposition unit 110b. The superimposition unit 210b outputs the superimposition images 11a and 11b to the image output unit 210c in order.

The image output unit 210c is a processing unit that acquires the superimposition images 11a and 11b from the superimposition unit 210b and outputs the acquired superimposition images 11a and 11b to the image bifurcation unit 220. The superimposition images 11a and 11b are transmitted through the image bifurcation unit 220 and reach the subsequent-stage image processing units 240 and 250.

The image bifurcation unit 220 is a circuit that transmits signals such as the superimposition images 11a and 11b received from the initial-stage image processing unit 210. For example, the image bifurcation unit 220 includes a buffer, a memory, and various signal processing ICs, and the superimposition images 11a and 11b, and the like are transmitted to the subsequent-stage image processing units 240 and 250 via the buffer, the memory, and various signal processing ICs.

The storage unit 235 is a storage device that holds state determination result data 235a. The storage unit 235 corresponds to a semiconductor memory element such as a RAM, a ROM, or a flash memory, or a storage device such as an HDD. The storage unit 235 may be any one of a volatile memory or a non-volatile memory, or both of the volatile memory and the non-volatile memory may be used.

The state determination result data 235a is information on a result of determining a state of the captured image. A data structure of the state determination result data 235a is the same as the data structure of the state determination result data 135a described with reference to FIG. 4.

The subsequent-stage image processing unit 240 is a processing unit that determines a state of the captured image on the basis of the superimposition images 11a and 11b and stores the state determination result data 235a in the storage unit 235. When an abnormality in the captured image is detected, the subsequent-stage image processing unit 240 outputs the state determination result data 235a to the CAN microcomputer 260. Further, the subsequent-stage image processing unit 240 performs sensing processing and the like on the superimposition images 11a and 11b.

An image input unit 240a is a processing unit that acquires the superimposition images 11a and 11b transmitted from the initial-stage image processing unit 210. The image input unit 240a outputs the superimposition images 11a and 11b to a determination unit 240b. Further, the image input unit 240a outputs the superimposition images 11a and 11b to an analysis processing unit 240c.

The determination unit 240b is a processing unit that determines a state of the captured image on the basis of the superimposition images 11a and 11b. The determination unit 240b sets "1" in each bit area of the state determination result data 235a according to a determination result. Processing in which the determination unit 240b determines the state of the captured image on the basis of the superimposition images 11a and 11b is the same as the processing in which the determination unit 140b determines the state of the captured image.

The analysis processing unit 240c is a processing unit that acquires the superimposition images 11a and 11b from the image input unit 240a and performs various sensing processing on an area (sensing area) other than the unused areas among the areas of the superimposition images 11a and 11b. The analysis processing performed by the analysis processing unit 240c corresponds to the sensing processing performed by the analysis processing unit 140c.

A notification unit 240d is a processing unit that refers to the state determination result data 235a, and in a case where "1" is set in a state abnormality bit area, the notification unit 240d outputs the state determination result data 235a to the CAN microcomputer 260. Note that the notification unit 240d may notify of various messages in the same manner as the notification unit 140d.

The subsequent-stage image processing unit 250 is a processing unit that outputs, as an image for viewing, the superimposition image transmitted from the image bifurcation unit 220 to the display device 300 and causes the display device 300 to display the superimposition image.

The CAN microcomputer 260 is a processing unit that makes various notifications and responses in a case where the state determination result data 235a is acquired from the notification unit 240d. For example, the CAN microcomputer 260 performs the same processing as that of the notification unit 140d described with reference to FIG. 12, generates information on a message, and causes the display device 300 to display the message. In a case where 1 is set in an image sticking bit area of the state determination result data 235a and in a case where 1 is set in a video masking bit area, the CAN microcomputer 260 transmits the reset command to the initial-stage image processing unit 210. Further, the CAN microcomputer 260 outputs the state determination result data 235a to the wireless communication unit 270.

The wireless communication unit 270 is a processing unit that performs wireless communication with the dealer server 400 and transmits the state determination result data 235a received from the CAN microcomputer 260 to the dealer server 400. The wireless communication unit 270 corresponds to a wireless communication device. Note that the imaging device 200 may be connected to the dealer server 400 in a wired manner, or may be connected to the dealer server 400 via another network.

3-3. Processing Procedure of Imaging Device According to Second Embodiment

Figure 17:
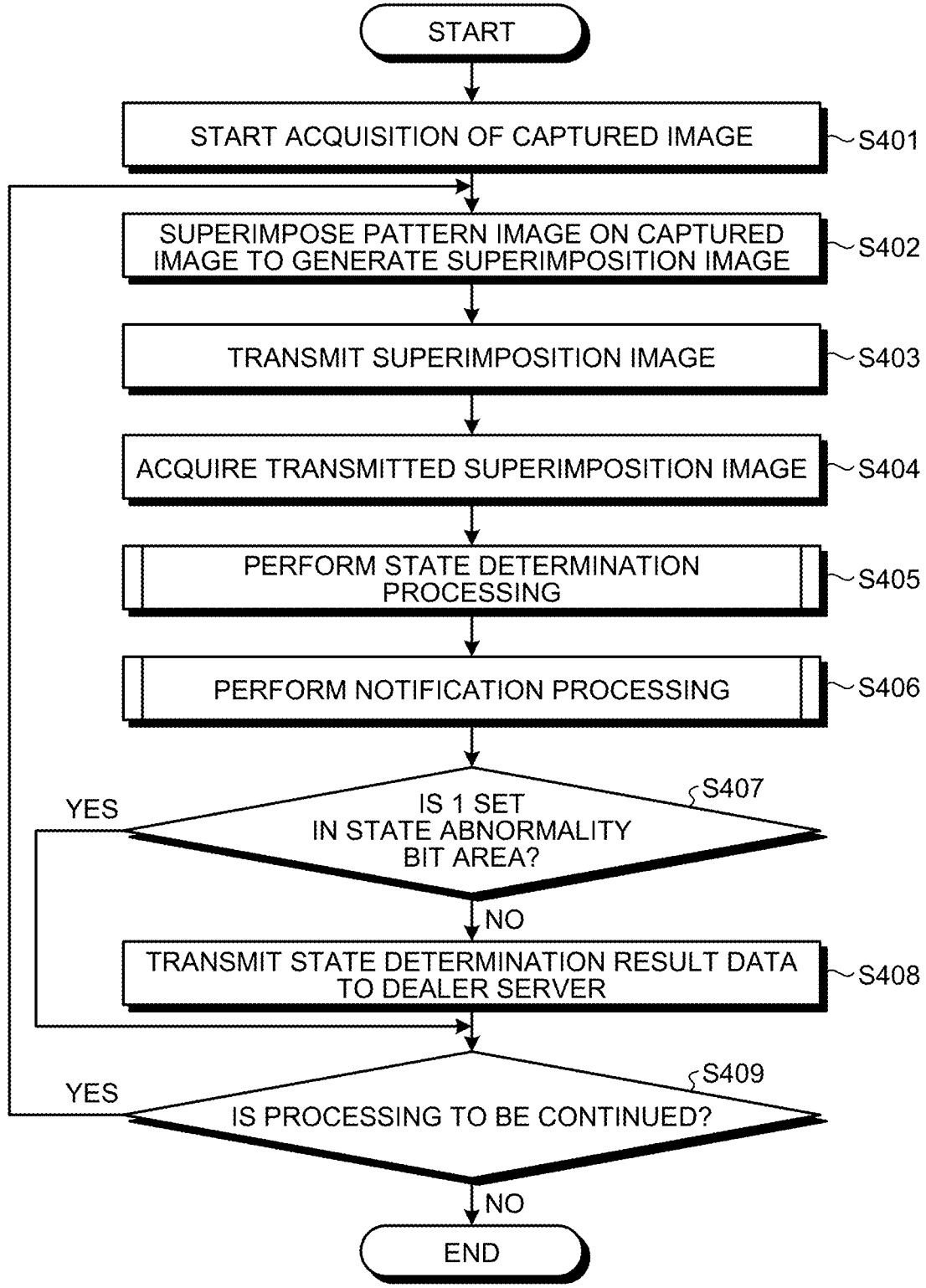
FIG. 17 is a flowchart illustrating a processing procedure of an imaging device according to the second embodiment.

FIG. 17 is a flowchart illustrating a processing procedure of the imaging device according to the second embodiment. As illustrated in FIG. 17, the imaging element unit 210a of the imaging device 200 starts acquisition of a captured image (Step S401).

The superimposition unit 210b of the imaging device 200 superimposes a pattern image on the captured image to generate a superimposition image (Step S402). The image output unit 210c of the imaging device 200 transmits the superimposition image to the subsequent-stage image processing units 240 and 250 (Step S403).

The image input unit 240a of the imaging device 200 acquires the superimposition image transmitted from the image bifurcation unit 220 (Step S404). The determination unit 240b of the imaging device 200 performs state determination processing (Step S405). The notification unit 240d of the imaging device 200 performs notification processing (Step S406).

The CAN microcomputer 260 of the imaging device 200 determines whether or not 1 is set in the state abnormality bit area of the state determination result data 235a (Step S407). In a case where 1 is not set in the state abnormality bit area (Step S407, No), the CAN microcomputer 260 proceeds to Step S409.

In a case where 1 is set in the state abnormality bit area (Step S407, Yes), the CAN microcomputer 260 transmits the state determination result data 235a to the dealer server 400 (Step S408).

In a case of continuing the processing (Step S409, Yes), the imaging device 200 proceeds to Step S402. In a case of not continuing the processing (Step S409, No), the imaging device 200 ends the processing.

The state determination processing in Step S405 of FIG. 17 corresponds to the state determination processing illustrated in FIG. 12. The notification processing in Step S406 of FIG. 17 corresponds to the notification processing illustrated in FIG. 13.

3-4. Effects of Imaging Device According to Second Embodiment

As described above, the imaging device 200 according to the second embodiment generates a superimposition image in which images are superimposed on unused areas of a captured image, and determines a state of the captured image on the basis of the characteristics of the areas on which the images are superimposed in the superimposition image transmitted from the initial-stage image processing unit 210 to the subsequent-stage image processing unit 240. As a result, in a case where an unintended state change occurs in the captured image transmitted from the initial-stage image processing unit 210 for some reason, it is possible to determine the state change. By determining the state change, it is possible to perform an operation according to a reset command transmitted to the initial-stage image processing unit 210 and to alert the driver.

Note that, as described with reference to FIG. 16, the superimposition image (video signal) output from the initial-stage image processing unit 210 is distributed by the image bifurcation unit 220 to the subsequent-stage image processing unit 240 for sensing and the subsequent-stage image processing unit 250 for viewing. In this case, since the superimposition image transmitted to the subsequent-stage image processing units 240 and 250 passes through the image bifurcation unit 220, the subsequent-stage image processing units 240 and 250 do not necessarily receive the same superimposition image, and different state abnormalities may occur.

For example, the original superimposition image may be properly input to the subsequent-stage image processing unit 250 for viewing, while the superimposition image input to the subsequent-stage image processing unit 240 for sensing may be in an abnormal state. In this case, an erroneous sensing result may be output from the subsequent-stage image processing unit 240 for sensing, but the image (superimposition image) confirmed by the user is the output from the subsequent-stage image processing unit 250 for viewing, and thus is not abnormal. Therefore, the abnormality cannot be noticed. Therefore, as described with reference to FIG. 16, since the initial-stage image processing unit 210 and the subsequent-stage image processing unit 240 for sensing are incorporated, in a case where there is an abnormality in the superimposition image input to the subsequent-stage image processing unit 240 for sensing (even in a case where there is no abnormality in the superimposition image input to the subsequent-stage image processing unit 250), it is possible to detect the abnormality.

3-5. Example of Service of Dealer Server According to Second Embodiment

Figure 18:
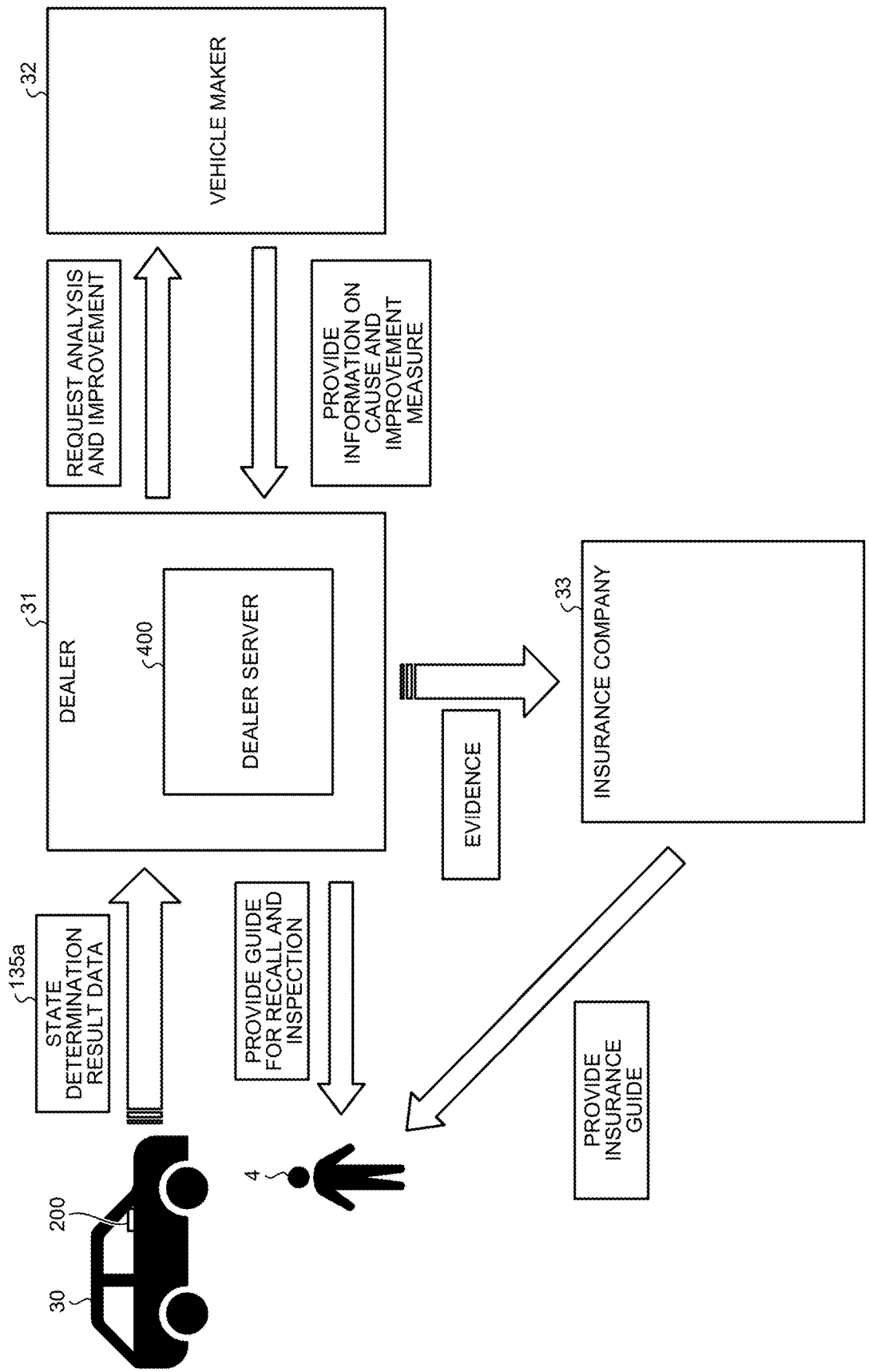
FIG. 18 is a diagram for describing an example of a service provided by a dealer server.

FIG. 18 is a diagram for describing an example of a service provided by the dealer server. As illustrated in FIG. 18, it is assumed that, in this service, a user 4, a vehicle 30, a dealer 31, a vehicle maker 32, and an insurance company 33 are involved.

The user 4 is the owner of the vehicle 30. The vehicle 30 is a vehicle on which the imaging device 200 is mounted described with reference to FIG. 16. The dealer 31 is a shop that sold the vehicle 30 to the user 4 and owns the dealer server 400. The vehicle maker 32 is a vehicle maker that manufactured the vehicle 30. The insurance company 33 is an insurance company of the insurance that the user 4 subscribes to.

In a case where an abnormal state of the captured image is detected, the imaging device 200 mounted on the vehicle 30 transmits the state determination result data 235*a* to the dealer server 400 through wireless communication. For example, the imaging device 200 may provide identification information for uniquely identifying the vehicle 30 or the user 4 when transmitting the state determination result data 235*a*.

The dealer server 400 receives the state determination result data 235*a* transmitted from the imaging device 200, and stores the state determination result data 235*a* in the storage device. A salesperson of the dealer 31 operates the dealer server 400 and accesses the state determination result data 235*a* to identify the vehicle 30 in which the abnormality is detected.

The salesperson of the dealer 31 notifies the vehicle maker 32 of the state determination result data 235*a* and the like, and requests analysis of a cause of the abnormality, and improvement. The vehicle maker 32 analyzes the cause of the abnormality on the basis of the state determination result data 235*a*. The vehicle maker 32 provides, to the dealer 31, information on the cause and improvement measures.

When receiving the information on the cause and improvement measures, the salesperson of the dealer 31 provides, to the user 4, a guide for a recall and inspection, and notifies the insurance company 33 of the evidence. An evidence includes a result of analyzing the cause of the abnormality in the in-vehicle system, or the like.

The user 4 receives, from the insurance company 33, an insurance guide indicating that the insurance premium can be discounted, on the premise that the user 4 responds to the guide for a recall and inspection from the dealer 31.

As described with reference to FIG. 18, the dealer 31, the vehicle maker 32, and the insurance company can cooperate with each other by using the state determination result data 235*a* to provide the service to the user 4.

4. Hardware Configuration

Figure 19:
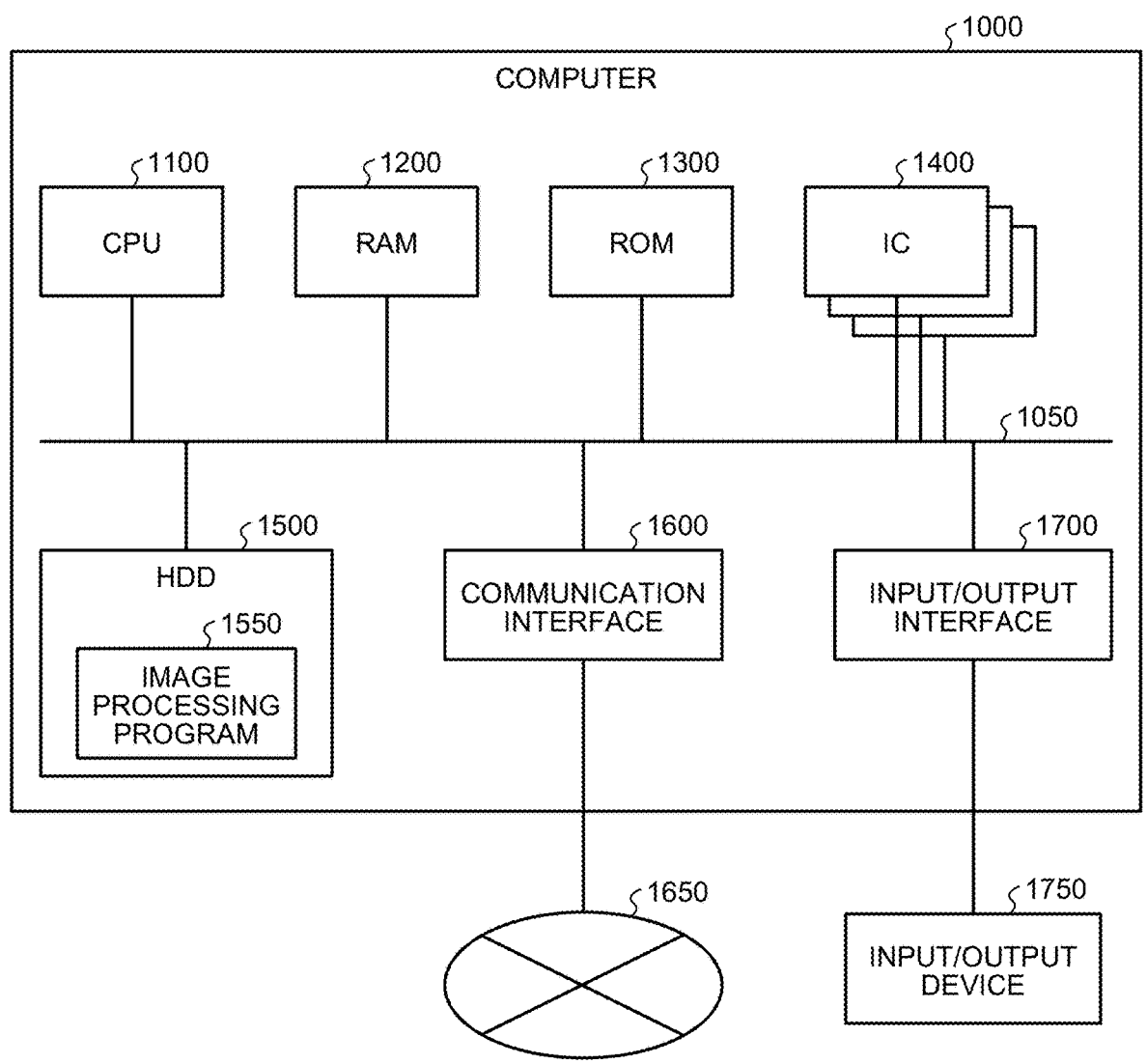
FIG. 19 is a hardware configuration diagram illustrating an example of a computer that implements functions of the imaging device.

The imaging devices 100 and 200 according to the respective embodiments described above are each implemented by, for example, a computer 1000 having a configuration as illustrated in FIG. 19. Hereinafter, the imaging device 100 according to the first embodiment will be described as an example. FIG. 19 is a hardware configuration diagram illustrating an example of the computer 1000 that implements functions of the imaging device 100. The computer 1000 includes a CPU 1100, a RAM 1200, a read only memory (ROM) 1300, an IC group 1400, a hard disk drive (HDD) 1500, a communication interface 1600, and an input/output interface 1700. Each component of the computer 1000 is connected by a bus 1050.

The CPU 1100 is operated on the basis of a program stored in the ROM 1300 or the HDD 1500, and controls each component. For example, the CPU 1100 loads the program stored in the ROM 1300 or the HDD 1500 on the RAM 1200 and performs processing corresponding to various programs.

The ROM 1300 stores a boot program such as a basic input output system (BIOS) executed by the CPU 1100 when the computer 1000 is started, a program that depends on the hardware of the computer 1000, or the like.

The IC group 1400 is ICs corresponding to the initial-stage image processing units 110 and 210, the signal transmission circuit 120, the image processing unit 130, the subsequent-stage image processing units 140, 240, and 250, the image bifurcation unit 220, and the like.

The HDD 1500 is a computer-readable recording medium in which a program executed by the CPU 1100, data used by the program, or the like, is non-temporarily recorded. Specifically, the HDD 1500 is a recording medium in which an image processing program according to the present disclosure, which is an example of program data 1550, is recorded. For example, the IC group 1400 may read the image processing program 1550 and perform processing to implement the functions of the imaging element unit 110*a*, the superimposition unit 110*b*, the image output unit 110*c*, the image input unit 140*a*, the determination unit 140*b*, the notification unit 140*d*, and the analysis processing unit, and the like.

The communication interface 1600 is an interface for the computer 1000 to be connected to an external network 1650 (for example, the Internet). For example, the CPU 1100 receives data from another equipment or transmits data generated by the CPU 1100 to another equipment via the communication interface 1500.

The input/output interface 1700 is an interface for connecting an input/output device 1750 and the computer 1000 to each other. For example, the CPU 1100 receives data from an input device such as a keyboard or mouse via the input/output interface 1600. Further, the CPU 1100 transmits data to an output device such as a display, a speaker, or a printer via the input/output interface 1600. Further, the input/output interface 1600 may function as a medium interface for reading a program or the like recorded in a predetermined recording medium. Examples of the medium include an optical recording medium such as a digital versatile disc (DVD) or a phase change rewritable disk (PD), a magneto-optical recording medium such as a magneto-optical disk (MO), a tape medium, a magnetic recording medium, and a semiconductor memory.

Further, the HDD 1500 stores the image processing program according to the present disclosure and the state determination result data 135*a* in the storage unit 135. Note that the CPU 1100 reads the program data 1550 from the HDD 1500 and executes the program data 1550, but as another example, these programs may be acquired from another device via the external network 1650.

5. Another Image Processing System

Figure 20:
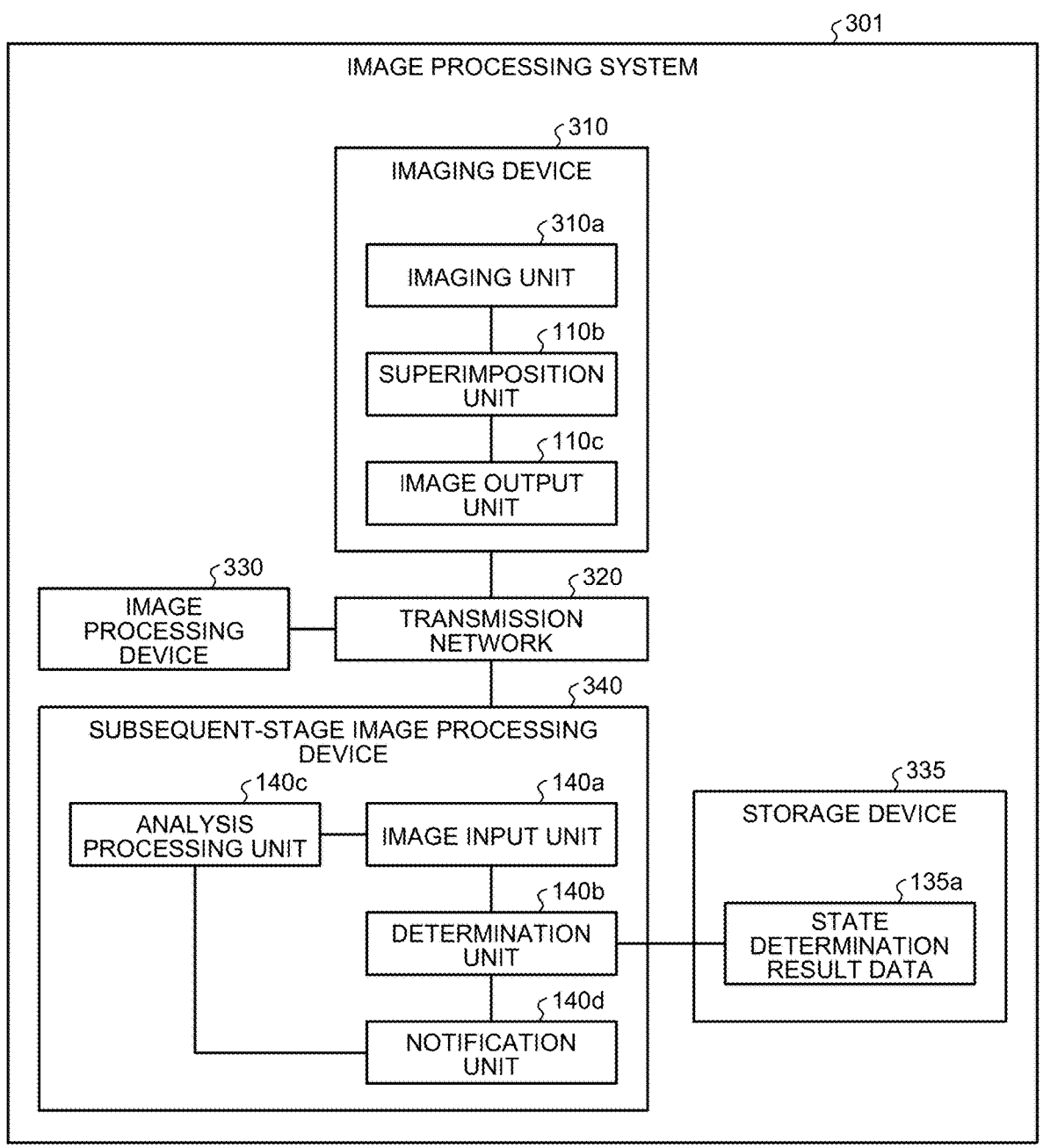
FIG. 20 is a diagram illustrating an example of a functional configuration of another image processing system.

FIG. 20 is a diagram illustrating an example of a functional configuration of another image processing system

301. As illustrated in FIG. 20, the image processing system 301 includes an imaging device 310, a signal transmission network 320, an image processing device 330, a storage device 335, and a subsequent-stage image processing device 340.

The imaging device 310 includes an imaging unit 310a, a superimposition unit 110b, and an image output unit 110c. A description of the superimposition unit 110b and the image output unit 110c is the same as that of the superimposition unit 110b and the image output unit 110c described with reference to FIG. 1. The imaging unit 310a corresponds to an image sensor such as a CMOS or CCD.

The signal transmission network 320 is a circuit that transmits signals such as superimposition images 11a and 11b received from the imaging device 310. A description of the signal transmission network 320 is the same as that of the signal transmission circuit 120 described with reference to FIG. 1.

The image processing device 330 is a processing unit that performs various image processing on the basis of an area other than the unused areas included in the superimposition images 11a and 11b. A description of the image processing device 330 is the same as that of the image processing unit 130 described with reference to FIG. 1.

The storage device 335 is a storage device that holds state determination result data 135a. The storage device 335 corresponds to a semiconductor memory element such as a RAM, a ROM, or a flash memory, or a storage device such as an HDD. The storage device 335 may be any one of a volatile memory or a non-volatile memory, or both of the volatile memory and the non-volatile memory may be used. A description of the storage device 335 is the same as that of the storage unit 135 described with reference to FIG. 1.

The subsequent-stage image processing device 340 is a processing unit that determines a state of the captured image on the basis of the superimposition images 11a and 11b and stores the state determination result data 135a in the storage device 335. The subsequent-stage image processing device 340 notifies another circuit of an external device (not illustrated) of the state determination result data 135a. Further, the subsequent-stage image processing device 340 performs analysis processing and the like on the superimposition images 11a and 11b.

For example, the subsequent-stage image processing device 340 includes an image input unit 140a, a determination unit 140b, an analysis processing unit 140c, and a notification unit 140d. A description of the image input unit 140a, the determination unit 140b, the analysis processing unit 140c, and the notification unit 140d is the same as that of the image input unit 140a, the determination unit 140b, the analysis processing unit 140c, and the notification unit 140d described with reference to FIG. 1.

6. Application to Automatic Driving System

Figure 21:
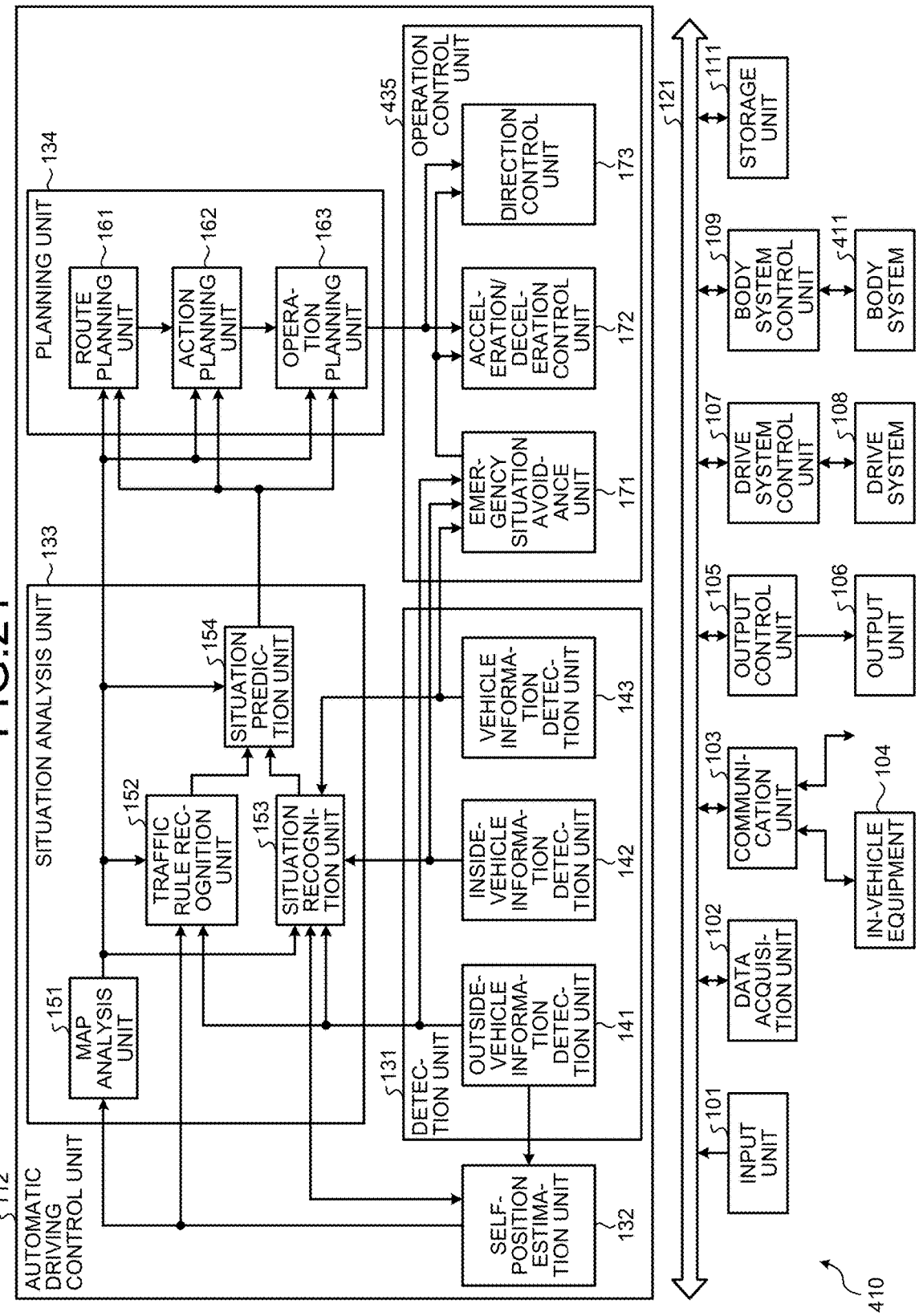
FIG. 21 is a block diagram illustrating an example of a schematic functional configuration of a vehicle control system to which the present technology can be applied.

By the way, the system of the present application described above can be applied to an automatic driving system (vehicle control system 410) illustrated in FIG. 21. In a case of applying the above-described system to the vehicle control system 410, the notification unit 140d notifies the vehicle control system 410 (emergency situation avoidance unit 171) of state determination result data and controls an automatic driving emergency action mode. Note that, hereinafter, a vehicle in which the vehicle control system 410 is provided is referred to as an own vehicle to distinguish it from other vehicles.

FIG. 22 is a flowchart illustrating a processing procedure of the automatic driving emergency action mode. As illustrated in FIG. 22, the vehicle control system 410 starts automatic driving (Step S501). The vehicle control system 410 receives the state determination result data from the notification unit 140d (Step S502).

In a case where there is no abnormality in a state bit (Step S503, No), the vehicle control system 410 proceeds to Step S507. On the other hand, in a case where there is an abnormality in the state bit (Step S503, Yes), the vehicle control system 410 proceeds to Step S504.

In a case where the abnormality is only noise and a time during which the noise continues is within a predetermined time (Step S504, Yes), the vehicle control system 410 proceeds to Step S507. On the other hand, in a case where the abnormality is not only noise, or the abnormality is only noise, and the noise continues for the predetermined time (Step S504, No), the vehicle control system 410 proceeds to Step S506. Note that, in the determination in Step S504, in a case where the noise continues for the predetermined time (1 second), it is regarded as abnormal, and in a case where the noise does not continue, it is not regarded as abnormal.

The vehicle control system 410 performs the processing of the emergency action mode when the vehicle is in automatic driving (Step S506). In Step S506, the emergency action mode includes Examples 1 to 3. Example 1: Perform Emergency Stop Processing The vehicle is decelerated by a brake control or the like and is stopped while blinking a hazard lamp, sounding a horn, and the like. Example 2: In a case where the abnormality is noise or an abnormal tone, the automatic driving mode ends and switching to a manual driving mode is performed. Example 3: In a case where the driver is in a situation where he/she cannot drive the vehicle and a state where shifting to the manual driving mode cannot be made continues for a predetermined time in Example 2, the stop processing of Example 1 is performed.

In a case of continuing the automatic driving (Step S507, Yes), the vehicle control system 410 proceeds to Step S502. On the other hand, in a case of not continuing the automatic driving (Step S507, No), the vehicle control system 410 ends the processing.

FIG. 21 is a block diagram illustrating an example of a schematic functional configuration of the vehicle control system 410 to which the present technology can be applied. The vehicle control system 410 includes an input unit 101, a data acquisition unit 102, a communication unit 103, in-vehicle equipment 104, an output control unit 105, an output unit 106, a drive system control unit 107, a drive system 108, a body system control unit 109, a body system 411, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to one another via the communication network 121. Examples of the communication network 121 include an in-vehicle communication network, a bus, or the like according to any standard such as a controller area network (CAN), a local interconnect network (LIN), a local area network (LAN), or FlexRay (registered trademark). Note that the respective components of the vehicle control system 410 may be directly connected to one another without going through the communication network 121.

Note that, hereinafter, when the respective components of the vehicle control system 410 are perform communication with one another via the communication network 121, a description of the communication network 121 will be omitted. For example, in a case where the input unit 101 and the automatic driving control unit 112 perform communication with each other via the communication network 121, it is simply described that the input unit 101 and the automatic driving control unit 112 perform communication with each other.

The input unit 101 includes a device used by a passenger to input various data, instructions, and the like. For example, the input unit 101 includes an operation device such as a touch panel, a button, a microphone, a switch, or a lever, and an operation device capable of receiving an input by a method other than manual operation, for example, by voice or gesture. Further, for example, the input unit 101 may be a remote control device using infrared rays or other radio waves, or externally connected equipment such as mobile equipment or wearable equipment corresponding to the operation of the vehicle control system 410. The input unit 101 generates an input signal on the basis of data, instructions, or the like input by the passenger, and supplies the input signal to each component of the vehicle control system 410.

The data acquisition unit 102 includes various sensors and the like that acquire data used for processing performed by the vehicle control system 410, and supplies the acquired data to each component of the vehicle control system 410.

For example, the data acquisition unit 102 includes various sensors for detecting the state of the own vehicle and the like. Specifically, for example, the data acquisition unit 102 includes a gyro sensor, an acceleration sensor, an inertial measurement unit (IMU), a sensor for detecting an accelerator pedal operation amount, a brake pedal operation amount, a steering wheel steering angle, and an engine speed, a motor rotation speed, a wheel rotation speed, or the like.

Further, for example, the data acquisition unit 102 includes various sensors for detecting information on the outside of the own vehicle. Specifically, for example, the data acquisition unit 102 includes an imaging device such as a time of flight (ToF) camera, a stereo camera, a monocular camera, an infrared camera, or other cameras. Further, for example, the data acquisition unit 102 includes an environment sensor for detecting a weather or climate, and a surrounding information detection sensor for detecting an object around the own vehicle. The environment sensor includes, for example, a raindrop sensor, a fog sensor, a sunshine sensor, a snow sensor, and the like. The surrounding information detection sensor includes, for example, an ultrasonic sensor, a radar, a light detection and ranging (laser imaging detection and ranging (LiDAR)), a sonar, and the like.

Further, for example, the data acquisition unit 102 includes various sensors for detecting a current position of the own vehicle. Specifically, for example, the data acquisition unit 102 includes a global navigation satellite system (GNSS) receiver that receives a GNSS signal from a GNSS satellite, or the like.

Further, for example, the data acquisition unit 102 includes various sensors for detecting information on the inside of the vehicle. Specifically, for example, the data acquisition unit 102 includes an imaging device that captures an image of the driver, a biosensor that detects biological information of the driver, a microphone that collects sound in a vehicle compartment, and the like. The biosensor is provided on, for example, a surface of a seat or a steering wheel, and detects biological information of a passenger sitting on the seat or a driver holding the steering wheel.

The communication unit 103 performs communication with the in-vehicle equipment 104 and various equipment, servers, base stations, and the like outside the vehicle, transmits data supplied from each component of the vehicle control system 410, and transmits the received data to each component of the vehicle control system 410. Note that a communication protocol supported by the communication unit 103 is not particularly limited, and the communication unit 103 may support a plurality of types of communication protocols.

For example, the communication unit 103 performs wireless communication with the in-vehicle equipment 104 by using a wireless LAN, Bluetooth (registered trademark), near field communication (NFC), a wireless USB (WUSB), or the like. Further, for example, the communication unit 103 performs wired communication with the in-vehicle equipment 104 by using a universal serial bus (USB), a high-definition multimedia interface (HDMI) (registered trademark), a mobile high-definition link (MHL), or the like via a connection terminal (not illustrated) (and a cable, as necessary).

Further, for example, the communication unit 103 performs communication with equipment (for example, an application server or control server) existing on an external network (for example, the Internet, a cloud network, or a network unique to a business operator) via a base station or access point. Further, for example, the communication unit 103 uses a peer to peer (P2P) technology to perform communication with a terminal (for example, a pedestrian, a store terminal, or a machine type communication (MTC) terminal) existing in the vicinity of the own vehicle. Further, for example, the communication unit 103 performs V2X communication such as vehicle-to-vehicle communication, vehicle-to-infrastructure communication, vehicle-to-home communication, and vehicle-to-pedestrian communication. Further, for example, the communication unit 103 includes a beacon receiving unit, receives radio waves or electromagnetic waves transmitted from a radio station or the like installed on the road, and acquires information such as a current position, traffic congestion, traffic regulation, or a time required.

The in-vehicle equipment 104 includes, for example, mobile equipment or wearable equipment of a passenger, information equipment carried in or attached to the own vehicle, and a navigation device for searching for a route to an arbitrary destination.

The output control unit 105 controls the output of various information to the passenger of the own vehicle or the outside of the vehicle. For example, the output control unit 105 generates an output signal including at least one of visual information (for example, image data) and auditory information (for example, audio data) and supplies the generated output signal to the output unit 106 to control the output of the visual information and auditory information from the output unit 106. Specifically, for example, the output control unit 105 combines image data captured by different imaging devices of the data acquisition unit 102 to generate a bird's eye view image, a panoramic image, or the like, and supplies an output signal including the generated image to the output unit 106. Further, for example, the output control unit 105 generates audio data including a warning sound or warning message for dangers such as collision, contact, and entry into a danger zone, and supplies an output signal including the generated audio data to the output unit 106.

The output unit 106 includes a device capable of outputting visual information or auditory information to the passenger of the own vehicle or the outside of the vehicle. For example, the output unit 106 includes a display device, an instrument panel, an audio speaker, a headphone, a wearable device such as a spectacle-type display worn by a passenger, a projector, a lamp, and the like. The display device included in the output unit 106 may be a device that displays visual information in a driver's field of view, such as a head-up display, a transmissive display, and a device having an augmented reality (AR) display function, in addition to a device having a normal display.

The drive system control unit 107 generates various control signals and supplies the generated control signals to the drive system 108 to control the drive system 108. Further, the drive system control unit 107 supplies a control signal to each component other than the drive system 108 as necessary, and makes a notification of a control state of the drive system 108, and the like.

The drive system 108 includes various devices related to a drive system of the own vehicle. For example, the drive system 108 includes a drive force generation device for generating a drive force of an internal combustion engine, a drive motor, or the like, a drive force transfer mechanism for transferring the drive force to wheels, a steering mechanism for adjusting a steering angle, a braking device that generates a braking force, an antilock brake system (ABS), an electronic stability control (ESC), an electric power steering device, and the like.

The body system control unit 109 generates various control signals and supplies the control signals to the body system 411 to control the body system 411. Further, the body system control unit 109 supplies a control signal to each component other than the body system 411 as necessary, and makes a notification of a control state of the body system 411, and the like.

The body system 411 includes various devices of a body system mounted on a vehicle body. For example, the body system 411 includes a keyless entry system, a smart key system, a power window device, a power seat, a steering wheel, an air conditioning device, various lamps (for example, a headlamp, a back lamp, a brake lamp, a turn indicator, and a fog lamp), and the like.

The storage unit 111 includes, for example, a magnetic storage device such as a read only memory (ROM), a random access memory (RAM), or a hard disc drive (HDD), a semiconductor storage device, an optical storage device, an optical magnetic storage device, and the like. The storage unit 111 stores various programs, data, and the like used by each component of the vehicle control system 410. For example, the storage unit 111 stores map data such as a three-dimensional high-precision map such as a dynamic map, a global map which is less accurate than the high-precision map and covers a wide area, and a local map including information on the surrounding of the own vehicle.

The automatic driving control unit 112 performs a control related to automatic driving, such as autonomous driving or driving support. Specifically, for example, the automatic driving control unit 112 performs a cooperative control for the purpose of implementing functions of an advanced driver assistance system (ADAS) that include collision avoidance or shock mitigation for the own vehicle, following driving based on an inter-vehicle distance, vehicle speed maintaining driving, a warning of collision of the own vehicle, a warning of deviation of the own vehicle from a lane, or the like. Further, for example, the automatic driving control unit 112 performs a cooperative control for the purpose of automatic driving in which the own vehicle autonomously travels without depending on the operation of the driver. The automatic driving control unit 112 includes a detection unit 131, a self-position estimation unit 132, a situation analysis unit 133, a planning unit 134, and an operation control unit 435.

The detection unit 131 detects various information necessary for controlling the automatic driving. The detection unit 131 includes an outside-vehicle information detection unit 141, an inside-vehicle information detection unit 142, and a vehicle state detection unit 143.

The outside-vehicle information detection unit 141 performs processing of detecting information on the outside of the own vehicle on the basis of data or a signal from each component of the vehicle control system 410. For example, the outside-vehicle information detection unit 141 performs detection processing, recognition processing, and tracking processing for an object around the own vehicle, and processing of detecting a distance to the object. Examples of the object to be detected include a vehicle, a person, an obstacle, a structure, a road, a traffic light, a traffic sign, and a road marking. Further, for example, the outside-vehicle information detection unit 141 performs processing of detecting the surrounding environment of the own vehicle. Examples of the surrounding environment to be detected include weather, a temperature, a humidity, a brightness, and a road surface condition. The outside-vehicle information detection unit 141 supplies data indicating a result of the detection processing to the self-position estimation unit 132, a map analysis unit 151, a traffic rule recognition unit 152, and a situation recognition unit 153 of the situation analysis unit 133, an emergency situation avoidance unit 171 of the operation control unit 435, and the like.

The inside-vehicle information detection unit 142 performs processing of detecting information on the inside of the vehicle on the basis of data or a signal from each component of the vehicle control system 410. For example, the inside-vehicle information detection unit 142 performs authentication processing and recognition processing for a driver, processing of detecting a state of the driver, processing of detecting a passenger, processing of detecting a vehicle interior environment, and the like. Examples of the state of the driver to be detected include a physical condition, an alertness level, a concentration level, a degree of fatigue, a gaze direction, and the like. Examples of the vehicle interior environment to be detected include a temperature, a humidity, a brightness, an odor, and the like. The inside-vehicle information detection unit 142 supplies data indicating a result of the detection processing to the situation recognition unit 153 of the situation analysis unit 133, the emergency situation avoidance unit 171 of the operation control unit 435, and the like.

The vehicle state detection unit 143 performs the processing of detecting the state of the own vehicle on the basis of data or a signal from each component of the vehicle control system 410. Examples of the state of the own vehicle to be detected include a speed, an acceleration, a steering angle, a presence/absence and content of an abnormality, a driving operation state, a position/tilt of a power seat, a door lock state, and a state of other in-vehicle equipment. The vehicle state detection unit 143 supplies data indicating a result of the detection processing to the situation recognition unit 153 of the situation analysis unit 133, the emergency situation avoidance unit 171 of the operation control unit 435, and the like.

The self-position estimation unit 132 performs processing of estimating a position and posture of the own vehicle on the basis of data or a signal from each component of the vehicle control system 410 such as the outside-vehicle information detection unit 141 or the situation recognition unit 153 of the situation analysis unit 133. In addition, the self-position estimation unit 132 generates a local map (hereinafter, referred to as a self-position estimation map) used for self-position estimation, as necessary. The self-position estimation map is, for example, a high-precision map using a technology such as simultaneous localization and mapping (SLAM). The self-position estimation unit 132 supplies data indicating a result of the estimation processing to the map analysis unit 151, the traffic rule recognition unit 152, and the situation recognition unit 153 of the situation analysis unit 133, and the like. Further, the self-position estimation unit 132 stores the self-position estimation map in the storage unit 111.

The situation analysis unit 133 performs processing of analyzing the own vehicle and the surrounding situation. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111 to build a map containing information necessary for processing for automatic driving, while using data or a signal from each component of the vehicle control system 410, such as the self-position estimation unit 132 and the outside-vehicle information detection unit 141 as necessary. The map analysis unit 151 supplies the built map to, for example, the traffic rule recognition unit 152, the situation recognition unit 153, the situation prediction unit 154, and the route planning unit 161, the action planning unit 162, and the operation planning unit 163 of the planning unit 134.

The traffic rule recognition unit 152 performs processing of recognizing a traffic rule in an area around the own vehicle on the basis of data or a signal from each component of the vehicle control system 410, such as the self-position estimation unit 132, the outside-vehicle information detection unit 141, and the map analysis unit 151. By this recognition processing, for example, a position and state of a signal around the own vehicle, a content of the traffic rule in the area around the own vehicle, a lane in which the vehicle can travel, and the like, are recognized. The traffic rule recognition unit 152 supplies data indicating a result of the recognition processing to the situation prediction unit 154 and the like.

The situation recognition unit 153 performs situation recognition processing for the own vehicle on the basis of data or a signal from each component of the vehicle control system 410, such as the self-position estimation unit 132, the outside-vehicle information detection unit 141, the inside-vehicle information detection unit 142, the vehicle state detection unit 143, and the map analysis unit 151. For example, the situation recognition unit 153 performs processing of recognizing the situation of the own vehicle, the situation in the area around the own vehicle, the situation of the driver of the own vehicle, and the like. In addition, the situation recognition unit 153 generates a local map (hereinafter, referred to as a situation recognition map) used for recognizing the situation in the area around the own vehicle, as necessary. The situation recognition map is, for example, an occupancy grid map.

Examples of the situation of the own vehicle to be recognized include a position, posture, and movement (for example, a speed, an acceleration, or a moving direction) of the own vehicle, and the presence/absence and content of an abnormality. Examples of the situation in the area around the vehicle to be recognized include a type and position of a surrounding stationary object, a type, position, and movement of a surrounding moving object (for example, a speed, an acceleration, or a moving direction), a configuration of a surrounding road, a road surface condition, and weather, a temperature, a humidity, a brightness, and the like of the area around the own vehicle. Examples of the state of the driver to be detected include a physical condition, an alertness level, a concentration level, a degree of fatigue, a gaze movement, a driving operation, and the like.

The situation recognition unit 153 supplies data indicating a result of the recognition processing (including a situation recognition map, as necessary) to the self-position estimation unit 132, the situation prediction unit 154, and the like. Further, the situation recognition unit 153 stores the situation recognition map in the storage unit 111.

The situation prediction unit 154 performs situation prediction processing for the own vehicle on the basis of data or a signal from each component of the vehicle control system 410, such as the map analysis unit 151, the traffic rule recognition unit 152, and the situation recognition unit 153. For example, the situation prediction unit 154 performs processing of predicting the situation of the own vehicle, the situation in the area around the own vehicle, the situation of the driver, and the like.

Examples of the situation of the own vehicle to be predicted include a behavior of the own vehicle, an occurrence of an abnormality, a distance that the own vehicle can travel, and the like. Examples of the situation in the area around the own vehicle to be predicted include a behavior of a moving object around the own vehicle, a change in signal state, a change in environment such as weather, and the like. Examples of the situation of the driver to be predicted include a behavior and physical condition of the driver, and the like.

The situation prediction unit 154 supplies, to the route planning unit 161, the action planning unit 162, and the operation planning unit 163 of the planning unit 134, and the like, data indicating a result of the prediction processing together with data from the traffic rule recognition unit 152 and the situation recognition unit 153.

The route planning unit 161 plans a route to a destination on the basis of data or a signal from each component of the vehicle control system 410 such as the map analysis unit 151 and the situation prediction unit 154. For example, the route planning unit 161 sets a route from a current position to a specified destination on the basis of a global map. Further, for example, the route planning unit 161 changes the route as appropriate on the basis of a situation such as traffic congestion, an accident, traffic regulation, or construction, and the physical condition of the driver. The route planning unit 161 supplies data indicating the planned route to the action planning unit 162 and the like.

The action planning unit 162 plans an action of the own vehicle for safe traveling along the route planned by the route planning unit 161 within a planned time, on the basis of data or a signal from each component of the vehicle control system 410 such as the map analysis unit 151 and the situation prediction unit 154. For example, the action planning unit 162 plans starting, stopping, a traveling direction (for example, forward, backward, left turn, right turn, and turning), a traveling lane, a traveling speed, overtaking, and the like. The action planning unit 162 supplies data indicating the planned action of the own vehicle to the operation planning unit 163 and the like.

The operation planning unit 163 plans the operation of the own vehicle for implementing the action planned by the action planning unit 162, on the basis of data or a signal from each component of the vehicle control system 410 such as the map analysis unit 151 and the situation prediction unit 154. For example, the operation planning unit 163 plans acceleration, deceleration, a traveling track, and the like. The operation planning unit 163 supplies data indicating the planned operation of the own vehicle to an acceleration/deceleration control unit 172 and a direction control unit 173 of the operation control unit 435.

The operation control unit 435 controls the operation of the own vehicle. The operation control unit 435 includes an emergency situation avoidance unit 171, the acceleration/deceleration control unit 172, and the direction control unit 173.

The emergency situation avoidance unit 171 performs processing of detecting an emergency situation such as collision, contact, entry into a danger zone, a driver abnormality, or a vehicle abnormality on the basis of detection results of the outside-vehicle information detection unit 141, the inside-vehicle information detection unit 142, and the vehicle state detection unit 143. When an occurrence of the emergency situation is detected, the emergency situation avoidance unit 171 plans the operation of the own vehicle to avoid the emergency situation, such as a sudden stop or a sharp turn. The emergency situation avoidance unit 171 supplies data indicating the planned operation of the own vehicle to the acceleration/deceleration control unit 172, the direction control unit 173, and the like. Further, when an instruction of the emergency action mode is received from the notification unit 140*d*, the emergency situation avoidance unit 171 issues an instruction such as an emergency stop to the acceleration/deceleration control unit 172, the direction control unit 173, and the like.

The acceleration/deceleration control unit 172 performs an acceleration/deceleration control for implementing the operation of the own vehicle planned by the operation planning unit 163 or the emergency situation avoidance unit 171. For example, the acceleration/deceleration control unit 172 calculates a target control value of a drive force generation device or a braking device for implementing planned acceleration, deceleration, or sudden stop, and supplies, to the drive system control unit 107, a control command indicating the calculated target control value.

The direction control unit 173 performs a direction control for implementing the operation of the own vehicle planned by the operation planning unit 163 or the emergency situation avoidance unit 171. For example, the direction control unit 173 calculates a target control value of a steering mechanism for implementing the traveling track or sharp turn planned by the operation planning unit 163 or the emergency situation avoidance unit 171, and supplies, to the drive system control unit 107, a control command indicating the calculated target control value.

7. Effects of Invention

An image processing device includes an acquisition unit, a superimposition unit, and a determination unit. The acquisition unit acquires a captured image. The superimposition unit generates a superimposition image in which images are superimposed on unused areas of the captured image. The determination unit determines a state of the captured image on the basis of characteristics of the areas on which the images are superimposed in the superimposition image transmitted from the superimposition unit. As a result, in a case where an unintended state change occurs in the transmitted captured image for some reason, it is possible to determine the state change.

The superimposition unit generates the superimposition image in which the images are superimposed on the unused areas outside an image circle among areas of the captured image. It is possible to determine whether or not there is an abnormality in the captured image without affecting various image processing for the captured image.

The image processing device further includes a sensing processing unit that performs sensing using the superimposition image, and the superimposition unit generates the superimposition image in which the images are superimposed on the unused areas that are not sensing targets of the sensing processing unit among the areas of the captured image. Therefore, it is possible to determine whether or not there is an abnormality in the captured image without affecting the sensing processing performed by the sensing processing unit.

The superimposition unit superimposes single-luminance images on the unused areas of the captured image to generate the superimposition image. The determination unit calculates standard deviations of luminances and integrated values of luminances on the basis of the single-luminances superimposed in the superimposition image, and determines the state of the captured image on the basis of the standard deviations and the integrated values. The determination unit determines whether or not pixel sticking has occurred in the captured image on the basis of the standard deviations of the single-luminance images superimposed in the superimposition image. The determination unit determines whether or not video masking has occurred in the captured image on the basis of a variance of the single-luminance images superimposed in the superimposition image. The determination unit determines whether or not noise has occurred in the captured image on the basis of the standard deviations of the single-luminance images superimposed in the superimposition image. The determination unit determines whether or not inversion has occurred in the captured image on the basis of the variance of the single-luminance images superimposed in the superimposition image. By using such a superimposition image in which the single-luminance images are superimposed, when an abnormality occurs in the captured image, it is possible to identify the factor of the state abnormality.

The superimposition unit superimposes gradation images on the unused areas of the captured image to generate the superimposition image. The determination unit determines whether or not a grayscale jump has occurred in the captured image by using integrated values of luminances of the gradation images superimposed in the superimposition image. The determination unit calculates standard deviations of luminances and integrated values of luminances on the basis of the gradation images superimposed in the superimposition image, and determines the state of the captured image on the basis of the standard deviations and the integrated values. The determination unit determines whether or not video masking has occurred in the captured image on the basis of a variance of the gradation images superimposed in the superimposition image.

The superimposition unit superimposes the images on the unused areas, which are four corners of the captured image, to generate the superimposition image. Therefore, a plurality of single-luminance images or gradation images having different luminances can be included in the superimposition image, whereby it is possible to identify the factor of the state abnormality.

The determination unit determines the state of the captured image on the basis of the superimposition image after being transmitted through a signal transmission circuit including a storage device and a signal processing circuit. As a result, it is possible to determine the state abnormality occurring due to transmission through the signal transmission circuit.

The superimposition unit and the determination unit are each included in different integrated circuits (ICs). As a result, it is possible to determine the state abnormality occurring due to transmission through the signal transmission circuit positioned between the respective ICs.

The image processing device further includes a notification unit that notifies an external device of a determination result of the determination unit. Therefore, it is possible to notify of the state of the captured image, or the factor when there is an abnormality.

An image processing system includes a first image processing device and a second image processing device. The first image processing device includes an acquisition unit and a superimposition unit. The acquisition unit acquires a captured image. The superimposition unit generates a superimposition image in which images are superimposed on unused areas of the captured image. The second image processing device includes a determination unit. The determination unit determines a state of the captured image on the basis of characteristics of the areas on which the images are superimposed in the superimposition image transmitted from the superimposition unit. As a result, in a case where an unintended state change occurs in the captured image transmitted from the first image processing device to the second image processing device, it is possible to determine the state change.

The acquisition unit acquires the captured image from an imaging device of a mobile object. As a result, when the captured image captured by the imaging device of the mobile object is transmitted from the first image processing device to the second image processing device, it is possible to determine whether or not an unintended state change has occurred.

Note that the present technology can also have the following configurations.

(1)
An image processing device comprising:
an acquisition unit that acquires a captured image;
a superimposition unit that generates a superimposition image in which images are superimposed on unused areas of the captured image; and
a determination unit that determines a state of the captured image on a basis of characteristics of areas on which the images are superimposed in the superimposition image transmitted from the superimposition unit.

(2)
The image processing device according to claim (1), wherein the superimposition unit generates the superimposition image in which the images are superimposed on the unused areas outside an image circle among areas of the captured image.

(3)
The image processing device according to claim (1) or (2), further comprising a sensing processing unit that performs sensing using the superimposition image, wherein the superimposition unit generates the superimposition image in which the images are superimposed on the unused areas that are not sensing targets of the sensing processing unit among areas of the captured image.

(4)
The image processing device according to any one of (1) to (3), wherein the superimposition unit superimposes single-luminance images on the unused areas of the captured image to generate the superimposition image.

(5)
The image processing device according to any one of (1) to (4), wherein the determination unit calculates standard deviations of luminances and integrated values of luminances on a basis of the single-luminances superimposed in the superimposition image, and determines the state of the captured image on a basis of the standard deviations and the integrated values.

(6)
The image processing device according to any one of (1) to (5), wherein the determination unit determines whether or not pixel sticking has occurred in the captured image on a basis of standard deviations of the single-luminance images superimposed in the superimposition image.

(7)
The image processing device according to any one of (1) to (6), wherein the determination unit determines whether or not video masking has occurred in the captured image on a basis of a variance of the single-luminance images superimposed in the superimposition image.

(8)
The image processing device according to any one of (1) to (7), wherein the determination unit determines whether or not noise has occurred in the captured image on a basis of standard deviations of the single-luminance images superimposed in the superimposition image.

(9)
The image processing device according to any one of (1) to (8), wherein the determination unit determines whether or not inversion has occurred in the captured image on a basis of a variance of the single-luminance images superimposed in the superimposition image.

(10)
The image processing device according to any one of (1) to (9), wherein the superimposition unit superimposes gradation images on the unused areas of the captured image to generate the superimposition image.

(11)
The image processing device according to any one of (1) to (10), wherein the determination unit determines whether or not a grayscale jump has occurred in the captured image by using integrated values of luminances of the gradation images superimposed in the superimposition image.

(12)
The image processing device according to any one of (1) to (11), wherein the determination unit calculates standard deviations of luminances and integrated values of luminances on a basis of the gradation images superimposed in the superimposition image, and determines the state of the captured image on a basis of the standard deviations and the integrated values.

(13)
The image processing device according to any one of (1) to (12), wherein the determination unit determines whether or not video masking has occurred in the captured image on a basis of a variance of the gradation images superimposed in the superimposition image.

(14)
The image processing device according to any one of (1) to (13), in which the determination unit determines whether or not inversion has occurred in the captured image on the basis of a variance of the gradation images superimposed in the superimposition image.

(15)
The image processing device according to any one of (1) to (14), wherein the superimposition unit superimposes the images on the unused areas, which are four corners of the captured image, to generate the superimposition image.

(16)
The image processing device according to any one of (1) to (16), wherein the determination unit determines the state of the captured image on a basis of the superimposition image after being transmitted through a signal transmission circuit including a storage device and a signal processing circuit.

(17)
The image processing device according to any one of (1) to (16), wherein the superimposition unit and the determination unit are each included in different integrated circuits (ICs).

(18)
The image processing device according to any one of (1) to (17), further comprising a notification unit that notifies an external device of a determination result of the determination unit.

(19)
The image processing device according to any one of (1) to (18), in which the determination unit calculates signal-to-noise (S/N) ratios of luminances and integrated values of luminances on the basis of the single-luminances superimposed in the superimposition image, and determines the state of the captured image on the basis of the S/N ratios and the integrated values.

(20)
The image processing device according to any one of (1) to (19), in which the determination unit calculates S/N ratios of luminances and integrated values of luminances on the basis of the gradation images superimposed in the superimposition image, and determines the state of the captured image on the basis of the S/N ratios and the integrated values.

(21)
An image processing method comprising, by a computer, processing of:
acquiring a captured image;
generating a superimposition image in which images are superimposed on unused areas of the captured image; and
determining a state of the captured image on a basis of characteristics of areas on which the images are superimposed in the superimposition image.

(22)
An image processing system comprising:
a first image processing device; and
a second image processing device,
wherein the first image processing device includes:
an acquisition unit that acquires a captured image; and
a superimposition unit that generates a superimposition image in which images are superimposed on unused areas of the captured image, and
the second image processing device includes
a determination unit that determines a state of the captured image on a basis of characteristics of areas on which the images are superimposed in the superimposition image transmitted from the superimposition unit.

(23)
The image processing system according to claim (22), wherein the acquisition unit acquires the captured image from an imaging device of a mobile object.

(24)
An image processing program for causing a computer to function as:
an acquisition unit that acquires a captured image;
a superimposition unit that generates a superimposition image in which images are superimposed on unused areas of the captured image; and
a determination unit that determines a state of the captured image on the basis of characteristics of areas on which the images are superimposed in the superimposition image transmitted from the superimposition unit.

REFERENCE SIGNS LIST

5 IMAGE PROCESSING SYSTEM
100, 200 IMAGING DEVICE
110, 210 INITIAL-STAGE IMAGE PROCESSING UNIT
110a, 210a IMAGING ELEMENT UNIT
110b, 210b SUPERIMPOSITION UNIT
110c, 210c IMAGE OUTPUT UNIT
120 SIGNAL TRANSMISSION CIRCUIT
130 IMAGE PROCESSING UNIT
135, 235 STORAGE UNIT
135a, 235a STATE DETERMINATION RESULT DATA
140, 240, 250 SUBSEQUENT-STAGE IMAGE PROCESSING UNIT
140a, 240a IMAGE INPUT UNIT
140b, 240b DETERMINATION UNIT
140c, 240c ANALYSIS PROCESSING UNIT
140d, 240d NOTIFICATION UNIT
220 IMAGE BIFURCATION UNIT
260 CAN MICROCOMPUTER
265 BUS
270 WIRELESS COMMUNICATION UNIT
300 DISPLAY DEVICE
400 DEALER SERVER

The invention claimed is:
1. An image processing device comprising:
at least one processing circuit configured to:
acquire a captured image;
generate a superimposition image in which images are superimposed on unused areas of the captured image; and
determine a state of the captured image on a basis of characteristics of areas on which the images are superimposed in the superimposition image, wherein the at least one processing circuit is configured to superimpose single-luminance images on the unused areas of the captured image to generate the superimposition image, to calculate standard deviations of luminances and integrated values of luminances on a basis of the single-luminance images superimposed in the superimposition image, and to determine the state of the captured image on a basis of the standard deviations and the integrated values.

2. The image processing device according to claim 1, wherein the at least one processing circuit is configured to generate the superimposition image in which the images are superimposed on the unused areas outside an image circle among areas of the captured image.

3. The image processing device according to claim 1, wherein the at least one processing circuit is configured to perform sensing using the superimposition image, and to generate the superimposition image in which the images are superimposed on the unused areas that are not sensing targets among areas of the captured image.

4. The image processing device according to claim 1, wherein the at least one processing circuit is configured to determine whether or not pixel sticking has occurred in the captured image on a basis of the standard deviations of the single-luminance images superimposed in the superimposition image.

5. The image processing device according to claim 1, wherein the at least one processing circuit is configured to determine whether or not video masking has occurred in the captured image on a basis of a variance of the single-luminance images superimposed in the superimposition image.

6. The image processing device according to claim 1, wherein the at least one processing circuit is configured to determine whether or not noise has occurred in the captured image on a basis of the standard deviations of the single-luminance images superimposed in the superimposition image.

7. The image processing device according to claim 1, wherein the at least one processing circuit is configured to determine whether or not inversion has occurred in the captured image on a basis of a variance of the single-luminance images superimposed in the superimposition image.

8. The image processing device according to claim 1, wherein the at least one processing circuit is configured to superimpose gradation images on the unused areas of the captured image to generate the superimposition image.

9. The image processing device according to claim 1, wherein the at least one processing circuit is configured to superimpose the images on the unused areas, which are four corners of the captured image, to generate the superimposition image.

10. The image processing device according to claim 1, wherein the at least one processing circuit is configured to determine the state of the captured image on a basis of the superimposition image after being transmitted through a signal transmission circuit including a storage device and a signal processing circuit.

11. The image processing device according to claim 1, wherein a superimposition function and a determination function are each performed in different integrated circuits (ICs).

12. The image processing device according to claim 1, wherein the at least one processing circuit is configured to notify an external device of a determination result.

13. An image processing device comprising:
at least one processing circuit configured to:
acquire a captured image;
generate a superimposition image in which images are superimposed on unused areas of the captured image; and
determine a state of the captured image on a basis of characteristics of areas on which the images are superimposed in the superimposition image, wherein the at least one processing circuit is configured to superimpose gradation images on the unused areas of the captured image to generate the superimposition image and to determine whether or not a grayscale jump has occurred in the captured image by using integrated values of luminances of the gradation images superimposed in the superimposition image.

14. The image processing device according to claim 13, wherein the at least one processing circuit is configured to calculate standard deviations of luminances and the integrated values of luminances on a basis of the gradation images superimposed in the superimposition image, and to determine the state of the captured image on a basis of the standard deviations and the integrated values.

15. The image processing device according to claim 13, wherein the at least one processing circuit is configured to determine whether or not video masking has occurred in the captured image on a basis of a variance of the gradation images superimposed in the superimposition image.

16. An image processing method executed by at least one processing circuit, the method comprising:
acquiring a captured image;
generating a superimposition image in which images are superimposed on unused areas of the captured image; and
determining a state of the captured image on a basis of characteristics of areas on which the images are superimposed in the superimposition image, wherein determining includes superimposing single-luminance images on the unused areas of the captured image to generate the superimposition image, calculating standard deviations of luminances and integrated values of luminances on a basis of the single-luminance images superimposed in the superimposition image, and determining the state of the captured image on a basis of the standard deviations and the integrated values.

17. An image processing system comprising:
a first image processing circuit; and
a second image processing circuit,
wherein the first image processing circuit is configured to:
acquire a captured image; and
generate a superimposition image in which images are superimposed on unused areas of the captured image, and
the second image processing circuit is configured to:
determine a state of the captured image on a basis of characteristics of areas on which the images are superimposed in the superimposition image transmitted from the superimposition unit, wherein the second image processing circuit is configured to superimpose single-luminance images on the unused areas of the captured image to generate the superimposition image, to calculate standard deviations of luminances and integrated values of luminances on a basis of the single-luminance images superimposed in the superimposition image, and to determine the state of the captured image on a basis of the standard deviations and the integrated values.

18. The image processing system according to claim 17, wherein the first processing circuit acquires the captured image from an imaging device of a mobile object.

* * * * *